(12) United States Patent
Lee et al.

(10) Patent No.: US 12,436,352 B2
(45) Date of Patent: Oct. 7, 2025

(54) OPTICAL FIBER RIBBON

(71) Applicant: LS CABLE & SYSTEM LTD., Anyang-si (KR)

(72) Inventors: Man Su Lee, Daegu (KR); Dong Soo Lee, Anyang-si (KR); Hui Jeong Yun, Gumi-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 0 days.

(21) Appl. No.: 18/288,542

(22) PCT Filed: Feb. 6, 2023

(86) PCT No.: PCT/KR2023/001650
§ 371 (c)(1),
(2) Date: Oct. 26, 2023

(87) PCT Pub. No.: WO2024/135930
PCT Pub. Date: Jun. 27, 2024

(65) Prior Publication Data
US 2025/0085501 A1 Mar. 13, 2025

(30) Foreign Application Priority Data
Dec. 23, 2022 (KR) .................. 10-2022-0182841

(51) Int. Cl.
*G02B 6/44* (2006.01)
(52) U.S. Cl.
CPC .......... *G02B 6/448* (2013.01); *G02B 6/4486* (2013.01)
(58) Field of Classification Search
CPC .............................. G02B 6/448; G02B 6/4486

USPC ........................................................... 385/15
See application file for complete search history.

(56) References Cited

U.S. PATENT DOCUMENTS

| 2014/0369657 A1* | 12/2014 | Hurley | G02B 6/4246 |
| | | | 29/428 |
| 2023/0123198 A1* | 4/2023 | Yasutomi | G02B 6/4433 |
| | | | 385/114 |

FOREIGN PATENT DOCUMENTS

| JP | 2000266973 A | 9/2000 |
| JP | 2004061649 A | 2/2004 |
| JP | 2013182157 A | 9/2013 |
| KR | 1020190043580 A | 4/2019 |
| KR | 20210145625 A | 12/2021 |
| KR | 20220139558 A | 10/2022 |

* cited by examiner

*Primary Examiner* — Jerry M Blevins
(74) *Attorney, Agent, or Firm* — K&L Gates LLP

(57) ABSTRACT

The present disclosure relates to an optical fiber ribbon, which is a component included in a high-density optical fiber cable including high-density optical fibers (which are installed in a limited space such as a conduit line) per unit area to build a large-capacity communication network, in which bonding of optical fibers is maintained to allow the optical fibers to be rolled in a width direction, and which is configured to achieve an optimal separation force on each bonding region in a longitudinal direction of the optical fibers and a direction perpendicular to the optical fibers, thereby improving workability in splitting or connecting the optical fiber ribbon and preventing inadvertent separation of the optical fibers of the optical fiber ribbon during the manufacture of the optical fiber cable.

15 Claims, 16 Drawing Sheets

OPTICAL FIBER RIBBON

CROSS-REFERENCE TO RELATED APPLICATIONS

The present application is a National Stage of International Application No. PCT/KR2023/001650 filed on Feb. 6, 2023, which claims the benefit of Korean Patent Application No. Oct. 10, 2022-0182841, filed on Dec. 23, 2022 with the Korean Intellectual Property Office, the entire contents of which are hereby incorporated by reference.

FIELD

The present disclosure relates to an optical fiber ribbon. More specifically, the present disclosure relates to an optical fiber ribbon, which is a component included in a high-density optical fiber cable including high-density optical fibers (which are installed in a limited space such as a conduit line) per unit area to build a large-capacity communication network, in which bonding of optical fibers is maintained to allow the optical fibers to be rolled in a width direction, and which is configured to achieve an optimal separation force on each bonding region in a longitudinal direction of the optical fibers and a direction perpendicular to the optical fibers, thereby improving workability in splitting or connecting the optical fiber ribbon and preventing inadvertent separation of the optical fibers of the optical fiber ribbon during the manufacture of the optical fiber cable.

BACKGROUND

An optical fiber ribbon in which a plurality of optical fibers are bonded may be used to efficiently build a large-capacity optical communication network.

The optical fiber ribbon is obtained by integrating a plurality of optical fibers arranged in parallel in a longitudinal direction by bonding them with a resin or the like, and manufactured in the form of a general strip. A polyprism type ribbon laminate may be formed by stacking optical fiber ribbons.

The optical fiber ribbon allows a plurality of optical fibers to be connected at once and thus is generally used in a large-capacity communication network.

In order to manufacture a high-density ribbon optical fiber cable, a rollable optical fiber ribbon that can be flexibly deformed when rolled or folded in the width direction has been introduced to increase the number of optical fibers in an optical fiber cable having the same area.

The shape of the rollable optical fiber ribbon should be maintained without causing the separation of bonded optical fibers when rolled in the width direction, and the optical fibers should be easily separated and prevented from being damaged when it is necessary to separate the optical fibers bonded to each other.

Meanwhile, several processes are performed to manufacture a high-density optical fiber cable with a rollable optical fiber ribbon. The several processes include a process of aggregating components, including an optical fiber ribbon, which are accommodated in the optical fiber cable, a tubing process of extruding a polymer insulation layer outside the optical fiber ribbon, and a cabling process of aggregating the components, including the tubed optical fiber ribbon, and covering the components with an external jacket.

During the manufacture of the optical fiber cable, optical fibers constituting the optical fiber ribbon and bonded while being arranged adjacent to each other may be pulled in a longitudinal direction of the cable by an external force. In this case, bonding parts of the optical fibers of the optical fiber ribbon may be separated and thus defects of the optical fiber cable may increase, thus decreasing installation and connection workability of the optical fiber cable.

Therefore, there is a growing need for an optical fiber ribbon, in which a separation force can be appropriately controlled in a bonding region in a longitudinal direction of optical fibers and a vertical direction to improve split or connection workability of the optical fiber ribbon and prevent the separation of the optical fibers of the optical fiber ribbon during the manufacture of the optical fiber cable.

SUMMARY

The present disclosure is directed to providing an optical fiber ribbon which is included in a high-density optical fiber cable including high-density optical fibers (which are installed in a limited space such as a conduit line) per unit area to build a large-capacity communication network, in which the bonding of optical fibers is maintained to allow the optical fibers to be rolled in a width direction, and which is configured to achieve an optimal separation force in each bonding region in a longitudinal direction of the optical fibers and a width direction of the optical fiber ribbon, thereby improving workability in splitting or connecting the optical fiber ribbon and preventing separation and damage of the optical fibers of the optical fiber ribbon during the manufacture of the optical fiber cable.

To achieve these objects, the present disclosure provides an optical fiber ribbon formed by bonding a plurality of optical fibers in parallel, wherein a pair of adjacent optical fibers among the plurality of optical fibers are bonded to each other through a plurality of bonding regions spaced apart from each other in a longitudinal direction of the optical fibers, and an average horizontal separation force for separating the pair of optical fibers from each other in a direction parallel to the longitudinal direction of the optical fibers is 300 gf or more in each of the bonding regions.

And an average vertical separation force for separating the pair of optical fibers from each other in a direction perpendicular to the longitudinal direction of the optical fibers may be 10 gf or less in each of the bonding regions.

And a ratio of the average vertical separation force to the average horizontal separation force may be in a range of 30 to 1200 in each of the bonding regions.

And the average vertical separation force may be an average of peak values of separation forces measured on four consecutive bonding regions among the plurality of bonding regions, wherein a minimum value among the peak values of the separation forces is 50% or more of a maximum value among the peak values of the separation forces and 70% or more of the average vertical separation force.

And the average horizontal separation force may be an average of peak values of separation forces measured on four consecutive bonding regions among the plurality of bonding regions, wherein a minimum value among the peak values of the separation forces is 40% or more of a maximum value among the peak values of the separation forces and 60% or more of the average horizontal separation force.

And the average vertical separation force may be preferably 8 gf or less in each of the bonding regions.

And the average horizontal separation force may be preferably 600 gf or more in each of the bonding regions.

And a plurality of non-bonding sections on which all of the optical fibers may be not bonded are provided on a cross section of the optical fiber ribbon in the longitudinal direction to be spaced apart from each other.

And the plurality of bonding regions each may comprise a plurality of bonding parts spaced apart from each other and at least one non-bonding part between the plurality of bonding parts.

And each of the plurality of bonding parts may comprise a plurality of bonding points that are spaced apart from each other at predetermined intervals or that are connected to each other.

And a ratio between a length of the bonding parts and a length of the non-bonding part may be in a range of 0.8 to 1.2.

And each of the plurality of bonding regions may have a density of 0.8 g/cm$^3$ to 1.4 g/cm$^3$, an elongation of 40% to 210%, a secant modulus of elasticity of 4 MPa to 90 MPa at a strain rate of 2.5%, and viscosity of 80 mPa·s to 800 mPa·s at 25° C.

And the optical fiber ribbon may comprise N optical fibers, wherein a position of a bonding region for bonding an $n^{th}$ optical fiber and an $(n+1)^{th}$ optical fiber among the N optical fibers in the longitudinal direction of the optical fibers corresponds to a center of a bonding region for bonding the $(n+1)^{th}$ optical fiber and an $(n+2)^{th}$ optical fiber in the longitudinal direction, wherein n is a natural number greater than or equal to 1 and (n+2) is a natural number equal to or less than N.

And to achieve these objects, the present disclosure provides a manufacturing method of an optical fiber cable with the optical fiber ribbon of any one of claims 1 to 3, the manufacturing method comprising: forming each of optical fiber ribbons by arranging a plurality of optical fibers in parallel, intermittently applying a resin between a pair of optical fibers in a longitudinal direction, and curing the resin by ultraviolet (UV) light to form the bonding regions; forming a ribbon aggregate by aggregating the optical fiber ribbons; forming optical units by extruding a polymer insulating layer outside the ribbon aggregate; forming a cable core by aggregating the optical units; and covering the cable core with an external jacket, wherein, in the forming of the ribbon aggregate or the forming of the cable core, an average horizontal separation force for separating the pair of optical fibers from each other on each of the bonding regions of the optical fiber ribbons in a direction parallel to a longitudinal direction of the optical fibers is 300 gf or more.

And the forming of the ribbon aggregate may comprise aggregating the plurality of optical fiber ribbons and a waterproof member.

And in the forming of the optical units, the polymer insulating layer may be in the form of a tube.

And the forming of the cable core may comprise aggregating the plurality of optical units and a waterproof member.

According to an optical fiber ribbon of the present disclosure, in a plurality of bonding regions on which a pair of adjacent optical fibers of the optical fiber ribbon are bonded to each other, a horizontal separation force is sufficiently large in a longitudinal direction of optical fibers in each bonding region and thus separation and damage of the optical fibers can be prevented due to a high bonding force of the bonding regions, even when optical fibers of the optical fiber ribbon are pulled in the longitudinal direction during the manufacture of an optical fiber cable. In addition, a vertical separation force is sufficiently low in a width direction of the optical fiber ribbon and thus the separation workability of the optical fibers can be improved during the splitting of optical fiber cable.

According to the optical fiber ribbon of the present disclosure, when each of a plurality of bonding regions includes a plurality of bonding parts spaced apart from each other and at least one non-bonding part therebetween, a horizontal separation force is sufficiently large in each of the bonding regions and thus separation and damage of the optical fibers can be prevented due to a high bonding force of the bonding regions even when the optical fibers of the optical fiber ribbon are pulled in a longitudinal direction during the manufacture of an optical fiber cable. In addition, a vertical separation force may decrease and thus the separation workability of the optical fibers of the optical fiber ribbon can be greatly improved.

According to the optical fiber ribbon of the present disclosure, the length or period of the plurality of bonding regions and the lengths of bonding parts and non-bonding parts of the bonding regions are adjusted to optimize the amount of a resin used to form the bonding regions and set a horizontal separation force to be sufficiently high in each of the plurality of bonding regions, thereby preventing separation and damage of the optical fibers due to a high bonding force of the bonding regions even when the optical fibers of the optical fiber ribbon are pulled in the longitudinal direction during the manufacture of an optical fiber cable. In addition, a vertical separation force can be sufficiently reduced to increase separation workability, so that a bonding force of the optical fibers required to maintain the state of a ribbon can be increased and the separation of the optical fibers can be facilitated during connection work and the like.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure will be thorough and complete, and fully convey the scope of the disclosure to those of ordinary skill in the art. Throughout the specification, the same reference numbers represent the same elements.

Figure 1:
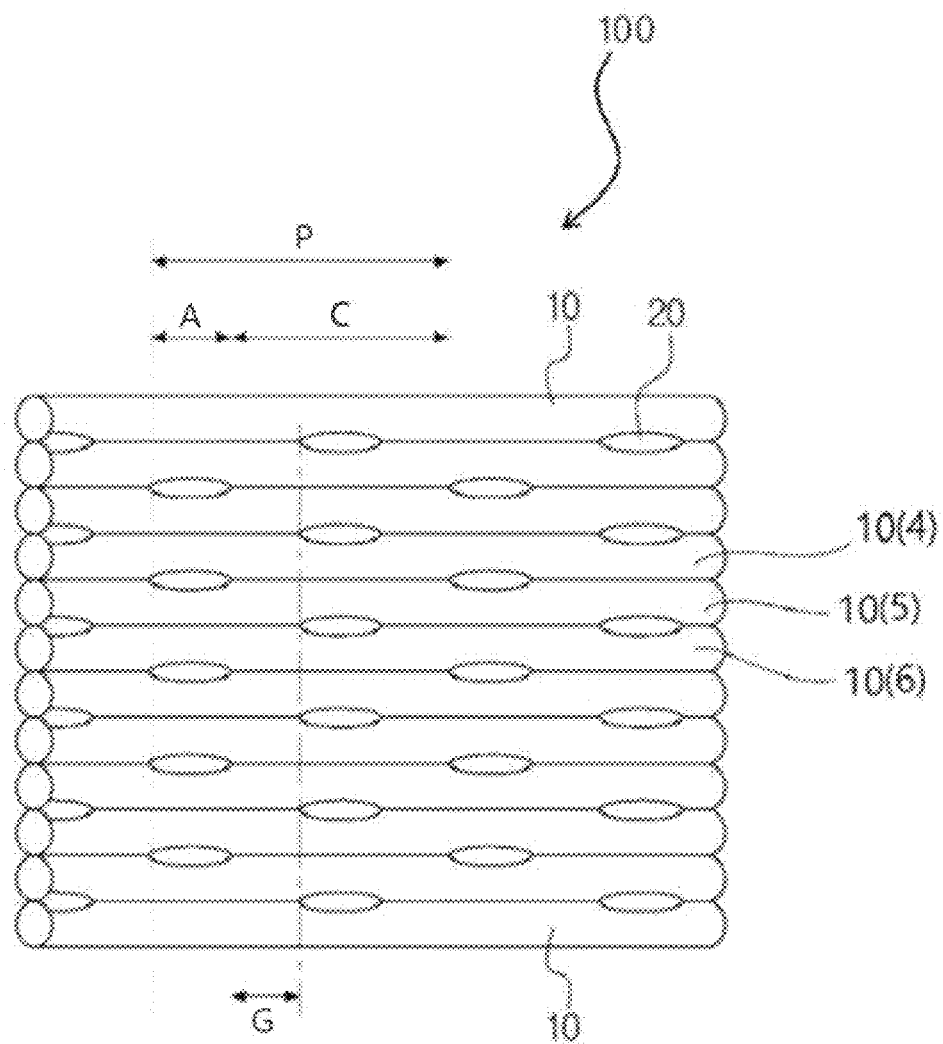
FIG. 1 is a plan view of an optical fiber ribbon according to an embodiment of the present disclosure.

FIG. 1 is a plan view of an optical fiber ribbon according to an embodiment of the present disclosure.

As shown in FIG. 1, an optical fiber ribbon 100 according to the present disclosure is formed by bonding a plurality of optical fibers 10 arranged in parallel in a longitudinal direction, and a pair of optical fibers 10 adjacent to each other among the plurality of optical fibers 10 may be bonded to each other through a plurality of bonding regions 20 spaced apart from each other in the longitudinal direction of the optical fibers 10.

As shown in FIG. 1, a plurality of non-bonding regions on which all the optical fibers 10 are not bonded to each other may be provided on a cross section of the optical fiber ribbon 100 in the longitudinal direction.

Generally, the optical fiber ribbon 100 may be understood as an aggregate that is in the form of a strip formed by sequentially bonding a plurality of optical fibers 10 to be parallel with each other.

The optical fiber ribbon 100 may be formed by bonding each pair of adjacent optical fibers 10 in the longitudinal direction among the plurality of optical fibers 10 arranged in parallel. Alternatively, the optical fiber ribbon 100 may include a plurality of stacked ribbon laminates to be connected at once and thus may be used to build a large-capacity optical communication network.

In the optical fiber ribbon 100 according to the present disclosure, a pair of adjacent optical fibers 10 among the plurality of optical fibers 10 are bonded to each other through a plurality of bonding regions 20 spaced apart from each other in a longitudinal direction of the optical fibers 10. Accordingly, the optical fiber ribbon 100 is rollable in a width direction and thus can be efficiently accommodated in an inner space of the optical fiber cable, because a state in which the plurality of optical fibers 10 are bonded to each other in the bonding regions 20 and are not bonded to each other in regions other than the bonding regions 20 is maintained.

As described above, the optical fibers 10 of the optical fiber ribbon 100 should be bonded to each other in the plurality of bonding regions 20 by a sufficient bonding force but for the splitting of the optical fiber ribbon 100, a pair of optical fibers 10 bonded to each other through each bonding region 20 should be easily separated during the separation of each optical fiber 10 from the optical fiber ribbon 100.

Specifically, a worker may separate a pair of optical fibers 10 bonded to each other by pulling them with a certain separation force or more in a width direction of the optical fiber ribbon 100 perpendicular to the longitudinal direction of the optical fibers 10.

In each bonding region 20, a separation force required to split a pair of optical fibers 10 in the vertical direction opposite to the longitudinal direction such that the optical fiber ribbon 100 and optical fibers 10 to be separated are changed to a T-shaped pattern (see FIG. 10) is referred to as a vertical separation force, also known as T-peel force (hereinafter indicated by T). In each bonding region 20, the Vertical separation force T should be minimized to improve split workability.

In the optical fiber ribbon 100 according to the present disclosure, in order to facilitate the separation of optical fibers in a direction perpendicular to a pair of optical fibers 10 bonded to each other, an average vertical separation force $T_{avg}$ in each bonding region 20 may be set to 10 gf or less, and preferably, when the average vertical separation force $T_{avg}$ in each bonding region 20 is set to 8 gf or less, optical loss and damage to an optical fiber coating layer may be minimized during separation of the optical fiber 10.

The average vertical separation force $T_{avg}$ should be understood as an average value of vertical separation forces T measured by a measuring method to be described below.

In the optical fiber ribbon 100 according to the present disclosure, not only the vertical separation force T required in each bonding region 20 but also a horizontal separation force, also known as breaking force (hereinafter indicated by B) which is a separation force required in the bonding region 20 for complete fracture of a pair of adjacent optical fibers 10, which are disposed in parallel in the longitudinal direction, in the longitudinal direction may be adjusted.

During the manufacture of a multi-core optical fiber cable with the optical fiber ribbon 100 of the present disclosure, several manufacturing processes, e.g., a tubing process, an aggregation process, and a cabling process, are frequently performed by pulling the plurality of optical fibers 10 of the optical fiber ribbon 100 by an external mechanical force in longitudinal direction of the optical fiber cable or the optical fibers 10. In such manufacturing processes, a sufficient high horizontal separation force B is required in each bonding region 20 to prevent inadvertent separation of the plurality of optical fibers 10 of the optical fiber ribbon 100.

Thus, in the optical fiber ribbon 100 of the present disclosure, in order to prevent separation of a pair of optical fibers 10 during the manufacture of the optical fiber cable, the average horizontal separation force $B_{avg}$ in each bonding region 20 may be set to 300 gf or more, and preferably, when the average horizontal separation force $B_{avg}$ in each bonding region 20 is set to 600 gf or more, the separation of individual optical fibers 10 may be prevented in the optical fiber cable **, thereby securing process stability.

The average horizontal separation force $B_{avg}$ should be understood as an average value of horizontal separation forces B measured by a measuring method to be described below.

Furthermore, in the optical fiber ribbon 100 of the present disclosure, a ratio $B_{avg}/T_{avg}$ Of the average horizontal separation force $B_{avg}$ to the average vertical separation force $T_{avg}$ of the bonding region 20 in each bonding region 20 may be adjusted to fall within a range of 30 to 1200.

When the ratio $B_{avg}/T_{avg}$ of the average horizontal separation force $B_{avg}$ to the average vertical separation force $T_{avg}$ of the bonding region 20 is less than 30, the optical fibers 10 of the optical fiber ribbon 100 in the optical fiber cable may be separated from each other during the manufacture of the optical fiber cable, and a pair of optical fibers 10 bonded to each other may not be easily separated and thus may be damaged during the separation of the optical fibers 10 or a tool for separating the optical fibers 10 without causing damage thereto may be required for the split of the optical fibers 10. When the ratio $B_{avg}/T_{avg}$ Of the average horizontal separation force $B_{avg}$ to the average vertical separation force $T_{avg}$ of the bonding region 20 is greater than 1200, the optical fibers 10 of each optical fiber ribbon 100 may be separated inadvertently or at least a portion of the bonding region 20 may be damaged when torsion or distortion is applied to the optical fiber ribbon 100 as in a process of aggregating the plurality of optical fiber ribbons 100 during the manufacture of the optical fiber cable, thereby preventing a smooth batch connection function through the optical fiber ribbon 100.

That is, in the optical fiber ribbon 100 of the present disclosure, the ratio $B_{avg}/T_{avg}$ of the average horizontal separation force $B_{avg}$ to the average vertical separation force $T_{avg}$ of the bonding region 20, which is in a trade-off relationship with separation workability of optical fibers and a bonding force between the optical fibers, may be appropriately adjusted to be within a range of 30 to 1200, so that the separation workability of the optical fibers during the split or connection of the optical fiber ribbon 100 may be improved and the optical fibers may be prevented from being inadvertently separated during the manufacture of the optical fiber cable.

Various embodiments of optical fiber ribbons 100 may be derived from a selective combination of a whole pattern of the optical fiber ribbon 100 in a direction toward a cross section thereof, a pattern of the bonding region 20, a length of the bonding region 20, a period of the bonding region 20, physical properties of a resin used to form the bonding region 20, etc., under conditions that in each bonding region 20 of the optical fiber ribbon 100 of the present disclosure, the average vertical separation force $T_{avg}$ should be 10 or less, the average horizontal separation force $B_{avg}$ should be 300 gf or more, and the ratio $B_{avg}/T_{avg}$ of the average horizontal separation force $B_{avg}$ to the average vertical separation force $T_{avg}$ of the bonding region 20 should be in a range of 30 to 1200. Various embodiments of an optical fiber ribbon according to the present disclosure will be described below.

Figure 2:
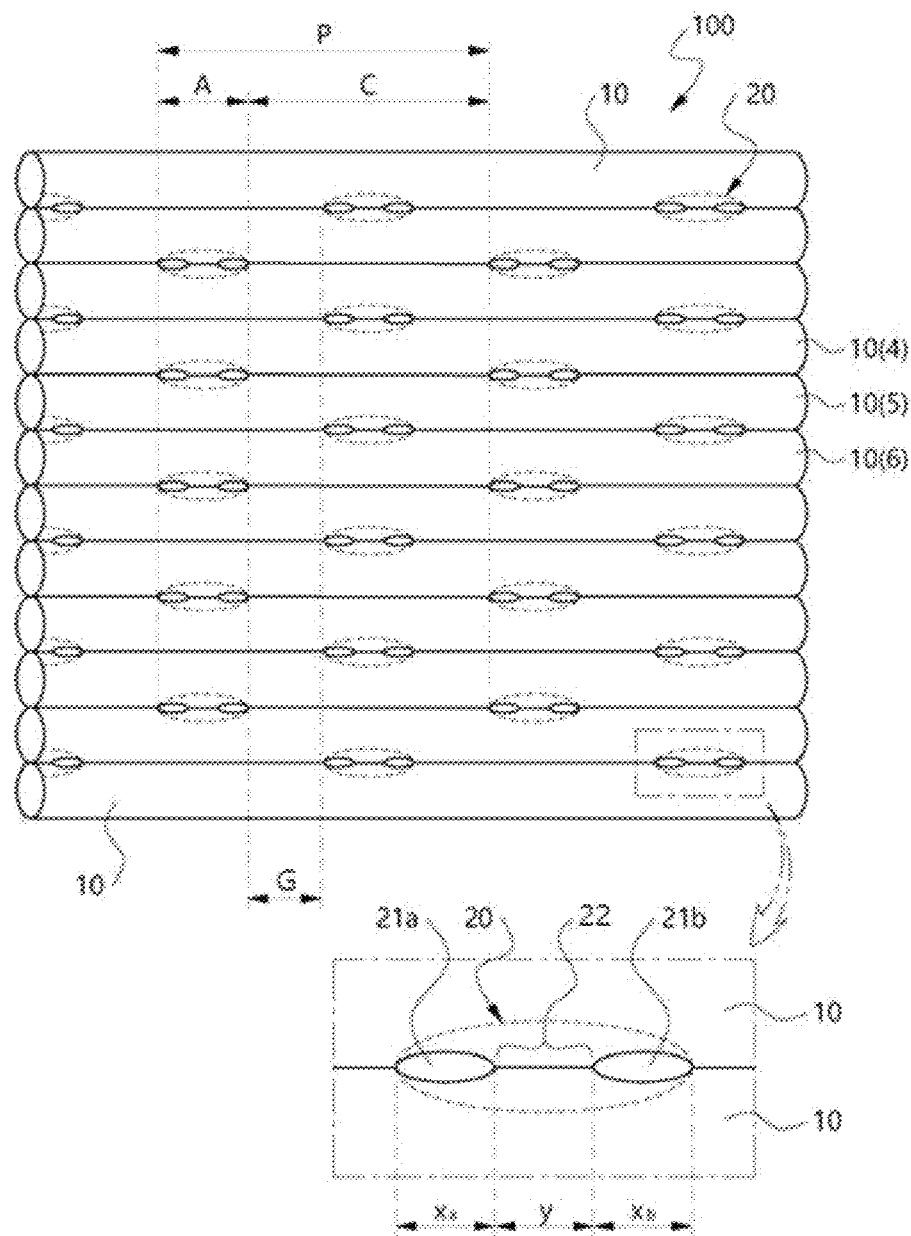
FIG. 2 is a plan view of an optical fiber ribbon according to another embodiment of the present disclosure.

FIG. 2 is a plan view of an optical fiber ribbon according to another embodiment of the present disclosure.

As shown in FIG. 2, an optical fiber ribbon 100 according to the present disclosure includes a plurality of optical fibers 10 arranged in parallel and bonded to each other, and a pair of adjacent optical fibers 10 among the plurality of optical fibers 10 are bonded to each other through a plurality of bonding regions 20. Here, each of the bonding regions 20 includes a plurality of bonding parts 21a and 21b spaced apart from each other and at least one non-bonding part 22 between the plurality of bonding parts 21a and 21b.

The plurality of bonding parts 21a and 21b and the at least one non-bonding part 22 of each of the bonding region 20 may be sequentially and repeatedly formed at regular intervals in the longitudinal direction of the optical fiber ribbon 100, and the lengths thereof may be shorter than that of the non-bonding region. Due to the above structure, uniform rolling characteristics of the optical fiber ribbon 100 may be achieved in the longitudinal direction.

As described above, in each of the plurality of bonding regions 20 of the optical fiber ribbon 100 of FIG. 2, an average vertical separation force $T_{avg}$ may be 10 gf or less and an average horizontal separation force $B_{avg}$ may be 300 gf or more, and a ratio $B_{avg}/T_{avg}$ Of the average horizontal separation force $B_{avg}$ to the average vertical separation force $T_{avg}$ may be set to be in a range of 30 to 1200 to achieve a high separation force and a high binding force of the optical fibers 10.

Unlike in the optical fiber ribbon 100 of FIG. 1, in the optical fiber ribbon 100 of FIG. 2, each of the plurality of bonding regions 20 includes the plurality of bonding parts 21a and 21b spaced apart from each other and the at least one non-bonding part 22 between the plurality of bonding parts 21a and 21b rather than forming the plurality of bonding regions 22 as one bonding part.

In this case, in each of the plurality of bonding regions 20 of the optical fiber ribbon 100, a sufficiently high horizontal separation force B can be maintained and thus the separation of the optical fibers 10 can be prevented during the manufacture of an optical fiber cable. At the same time, in each of the plurality of bonding regions 20, a total vertical separation force T may decrease and thus workability can be greatly improved during the separation of the optical fibers 10, and rolling characteristics can be greatly improved due to the non-bonding parts 22 of the bonding regions 20.

The optical fiber ribbon 100 of FIG. 2 is illustrated as including the plurality of bonding regions 20 with the two bonding parts 21a and 21b spaced apart from each other and one non-bonding part 22 between the two bonding parts 21a and 21b but a bonding part of the optical fiber ribbon 100 may be divided into three or more parts to obtain two or more non-bonding parts.

Here, the non-bonding part 22 of the bonding region 20 should be understood as a portion of the bonding region 20 on which the plurality of bonding parts 21a and 21b are not bonded to each other to be spaced apart from each other at a regular interval in the longitudinal direction of the optical fiber 10.

Figure 3:
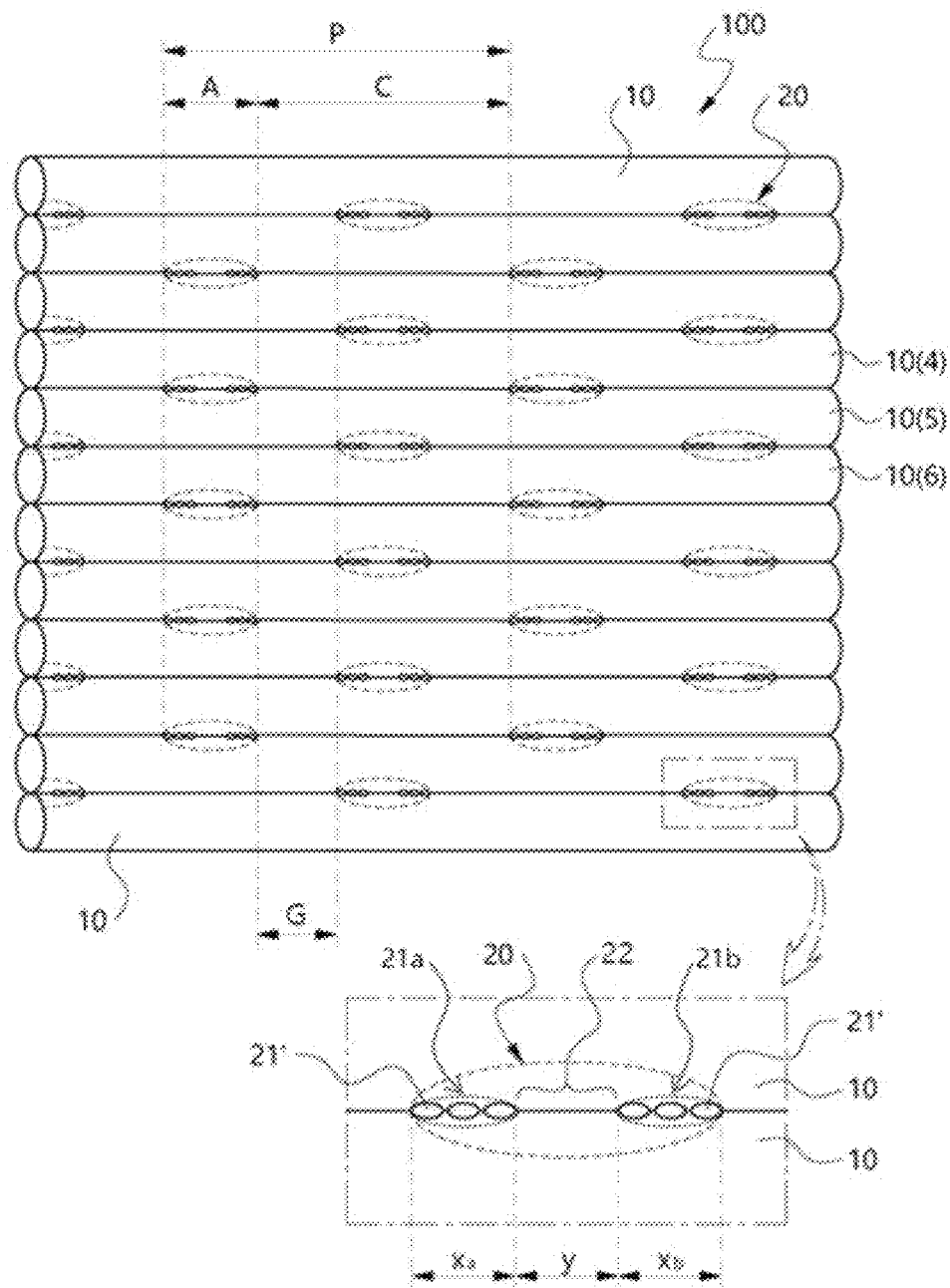
FIG. 3 is a plan view of an optical fiber ribbon according to another embodiment of the present disclosure.
Figure 4:
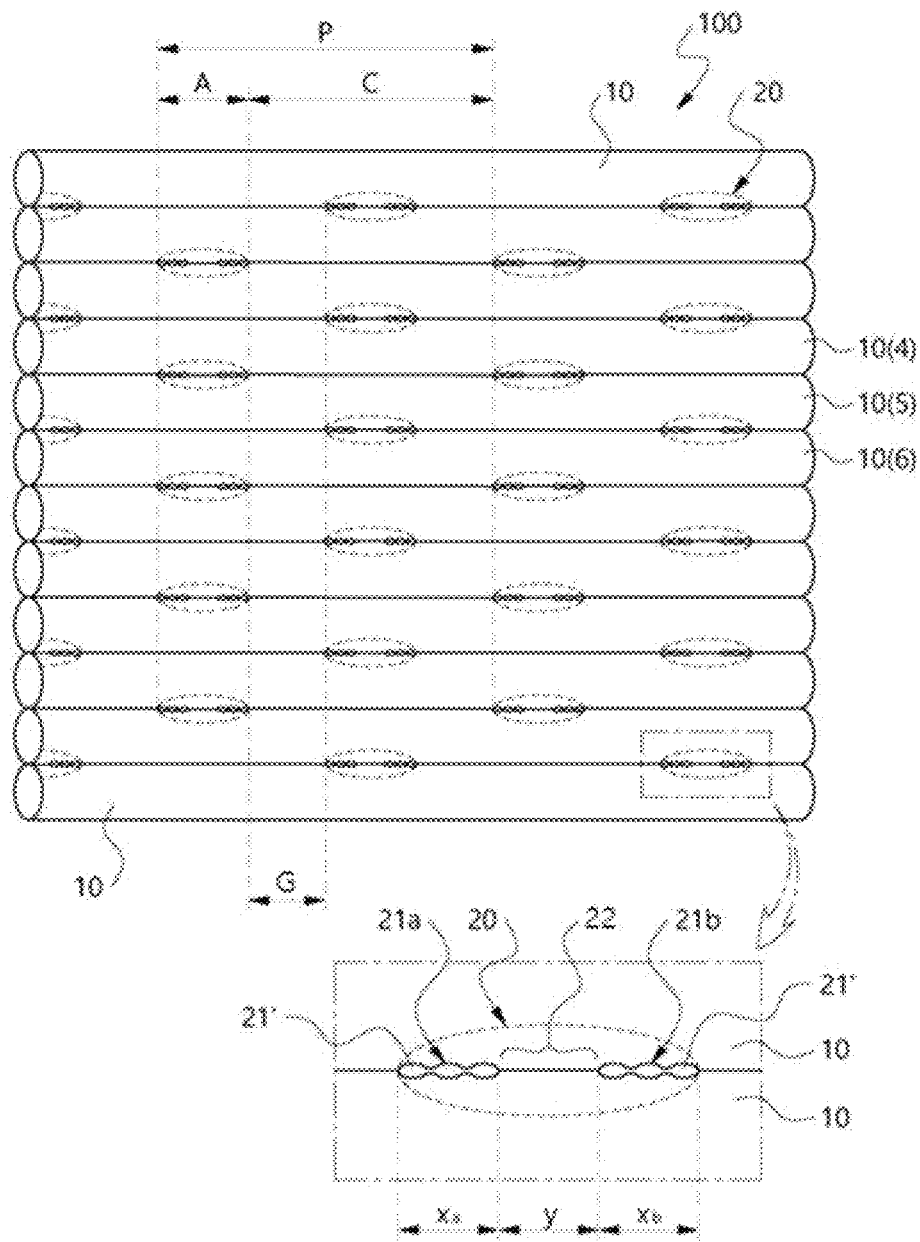
FIG. 4 is a plan view of an optical fiber ribbon according to another embodiment of the present disclosure.

FIGS. 3 and 4 are plan views of optical fiber ribbons according to other embodiments of the present disclosure.

As shown in FIGS. 3 and 4, in an optical fiber ribbon 100 according to the present disclosure, a plurality of bonding parts 21a and 21b that constitute each bonding region 20 may each include a plurality of discontinuous or continuous bonding part points 21' instead of being integrally formed having a certain width in a longitudinal direction.

As described above, in the optical fiber ribbon 100 shown in FIGS. 3 and 4, the bonding parts 21a and 21b each include the plurality of bonding points 21' to reduce the amount of a resin in each of these bonding parts, thereby improving flexibility and separation characteristics during rolling of the optical fiber ribbon 100 and reducing manufacturing costs of an optical fiber cable.

In the optical fiber ribbon 100 of FIG. 3, each of the plurality of bonding parts 21a and 21b of each bonding region 20 includes the plurality of bonding points 21', and the plurality of bonding points 21' may be arranged to be spaced a predetermined distance from each other. In the embodiment of FIG. 3, each of the plurality of bonding parts 21a and 21b of each bonding region 20 includes three bonding points 21' but the number of bonding points 21' may be increased or decreased.

In the optical fiber ribbon 100 of FIG. 4, each of the plurality of bonding parts 21a and 21b of each bonding region 20 includes the plurality of bonding points 21' but the plurality of bonding points 21' are integrally connected to each other without being separated or spaced apart from each other.

As shown in FIG. 4, when each of the bonding parts 21a and 21b is formed by connecting the plurality of bonding points 21', a bonding force of optical fibers can be improved more than when the plurality of bonding points 21' are spaced apart from each other, thereby improving a total separation force in a horizontal direction. Therefore, it is possible to further prevent the separation of the optical fibers during the manufacture of an optical fiber cable, reduce a deviation in separation forces in each of the bonding parts 21a and 21b, and reduce the amount of a resin, compared to the embodiment of FIG. 2.

Figure 5:
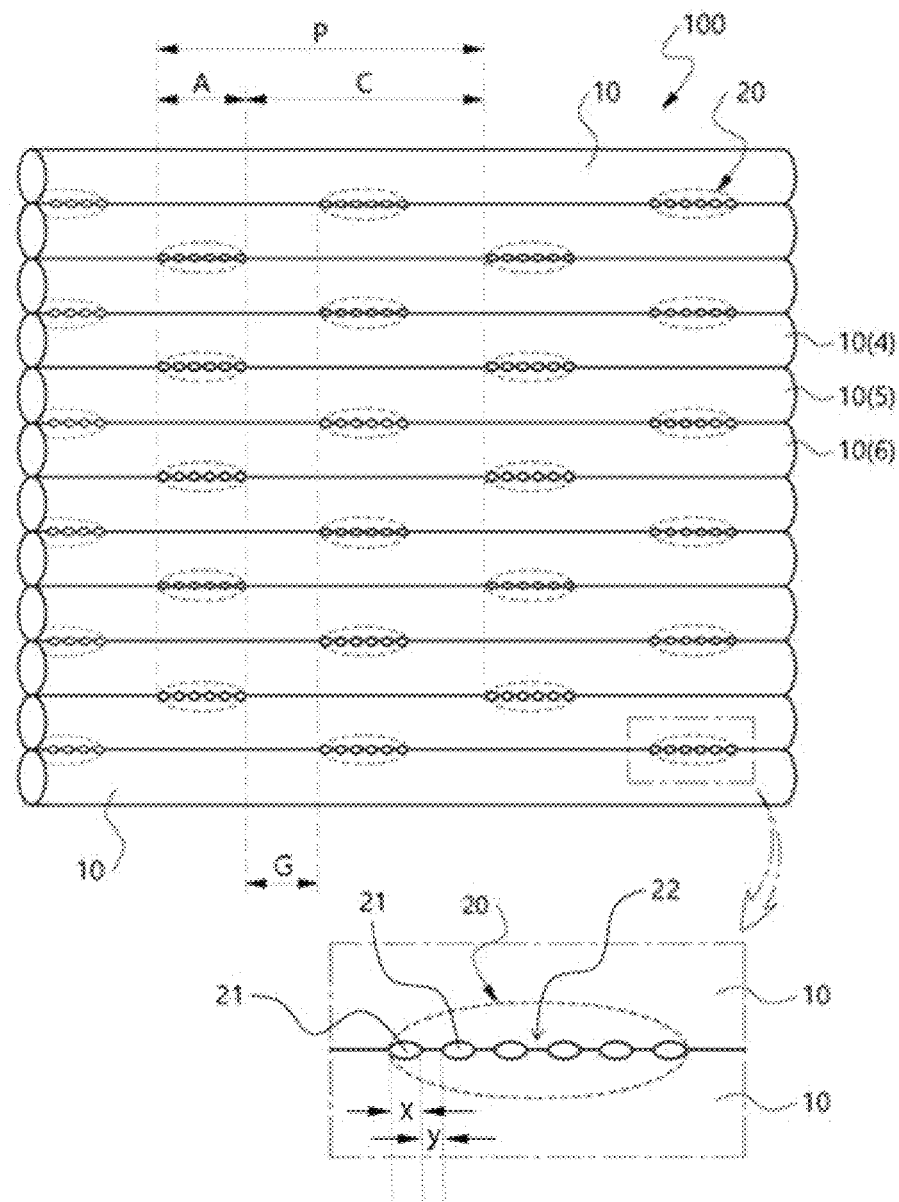
FIG. 5 is a plan view of an optical fiber ribbon according to another embodiment of the present disclosure.

FIG. 5 is a plan view of an optical fiber ribbon according to another embodiment of the present disclosure.

An optical fiber ribbon such as that of the embodiment shown in FIG. 2 has been introduced, in which each bonding region 20 includes a pair of bonding parts 21a and 21b and one non-bonding part 22 therebetween. In addition, in an optical fiber ribbon 100 according to the present disclosure, each bonding region 20 may include three or more bonding parts 21 spaced apart from each other and two or more non-bonding parts 22 between the bonding parts 21. That is, in each bonding region 20 of the optical fiber ribbon 100 according to the present disclosure, a total number of bonding parts 21 may be increased and the length and period of each bonding region 20 may be reduced.

As shown in FIG. 5, each bonding region 20 of the optical fiber ribbon 100 according to the present disclosure may include six bonding parts 21 spaced apart from each other, and a total of five non-bonding parts 22 each being located between each pair of bonding parts 21.

In the optical fiber ribbon 100 of the present disclosure, six bonding parts 21 of each bonding region 20 may be spaced the same distance from each other in a longitudinal direction of optical fibers. Here, each of the bonding parts 21 may not include bonding points but may be an integral bonding part formed by applying a resin at a certain width.

In this case, in the optical fiber ribbon 100 according to the present disclosure, an average horizontal separation force $B_{avg}$ of 300 gf or more may be achieved and the amount of a resin to be used to form each bonding part 21 may be reduced to sufficiently reduce a vertical separation force T and effectively prevent damage to the optical fibers 10 bonded through the bonding parts 21 during the splitting of the optical fibers 10.

Alternatively, the plurality of bonding parts 21 of FIG. 5 may be integrally connected to form one bonding region 20 without the non-bonding parts 22, similar to the bonding parts 21a and 21b of FIG. 4 that are formed by integrally connecting the plurality of bonding points 21' not to be separated or spaced apart from each other.

Furthermore, as shown in FIGS. 1 to 5, in order to secure flexibility of the optical fiber ribbon 100 according to the present disclosure to allow the optical fiber ribbon 100 to be rollable in a width direction, the bonding region 20 for bonding a pair of adjacent optical fibers 10 to each other may not be formed on an entire boundary area between the adjacent optical fibers 10 but may be discontinuously formed at the boundary area.

In the optical fiber ribbon 100 according to the present disclosure, a length A of each bonding region 20 may be in a range of 10 mm to 20 mm. Here, the length A of each bonding region 20 should be understood to mean the distance between opposite ends of one bonding part of each bonding region 20 in the longitudinal direction of the optical fiber 10 or the distance between opposite ends of the plurality of bonding parts 21a and 21b.

A length C of each non-bonding region on which the bonding region 20 on the boundary area between the pair of adjacent optical fibers in the longitudinal direction is not located may be in a range of 30 mm to 70 mm. A period P of each bonding region 20 may be in a range of 45 mm to 85 mm.

That is, in the optical fiber ribbon 100, each pair of adjacent optical fibers 10 are not entirely bonded to each other in the longitudinal direction but a plurality of bonding regions 20 each having a length A of 10 mm to 20 mm may be formed at a period P of 45 mm to 85 mm to set the length C of each non-bonding region to 30 mm to 70 mm, so that sufficient flexibility may be achieved to allow the optical fiber ribbon 100 to be rollable in a width direction and the separation and damage of each optical fiber 10 may be prevented.

Rolling may be smoothly performed but the optical fibers 10 may be inadvertently separated and damaged due to the structural weakness of the bonding parts 21 of the bonding region 20, when among such length restraints, e.g., the length A of the bonding region 20 of the optical fiber 10 in the longitudinal direction, the period P of the bonding region 20, and the length C of the non-bonding region, the length A of the bonding region 20 is set to be less than the above range thereof and thus the period P of the bonding region 20 and the length C of the non-bonding region are greater than the above ranges thereof. When the length A of the bonding region 20 is set to be greater than the range thereof and thus the period P of the bonding region 20 and the length C of the non-bonding part are less than the ranges thereof, rolling may not be easily performed in the width direction and the optical fibers 10 may be damaged or a certain optical fiber 10 may not be easily split during the rolling of the optical fiber ribbon 100.

In addition, a length G of a section (hereinafter referred to as a "non-bonding section") in which all optical fibers are not bonded to each other by the bonding region in the width direction of the optical fiber ribbon 100 is preferably in a range of about 10 mm to 30 mm to secure flexibility for rolling in the width direction and maintain the shape of the optical fiber ribbon 100.

Each bonding region 20 of the optical fiber ribbon 100 according to the present disclosure may include the plurality of bonding parts 21a and 21b and at least one non-bonding part 22 therebetween, and thus, a separation force may be reduced relatively on each bonding region 20 for bonding adjacent optical fibers 10 when one optical fiber 10 is separated from the optical fiber ribbon 100 in a direction perpendicular to the longitudinal direction of the optical fibers, and flexibility for rolling characteristics may be improved.

Meanwhile, in the optical fiber ribbon 100 shown in FIGS. 2 to 4, each bonding region 20 may include two or more bonding parts 21a and 21b spaced apart from each other and at least one non-bonding part 22 therebetween as described above. Here, each of lengths xa and xb of the bonding parts 21a and 21b and a length y of the non-bonding part 22 in the longitudinal direction of the optical fiber 10 may be in a range of 3 mm to 7 mm.

Preferably, a ratio between the lengths xa and xb of the bonding parts 21a and 21b and the length y of the non-bonding part 22 of the bonding region 20 may be in a range of 0.8 to 1.2.

That is, an appropriate binding force between the plurality of optical fibers 10 of the optical fiber ribbon 100 may be maintained, when in the embodiments of FIGS. 2 to 4, a ratio (xa/xb) between the length xa of the first bonding part 21a and the length xb of the second bonding part 21b, a ratio (xa/y) between the length xa of the first bonding part 21a and the length y of the non-bonding part 22, and a ratio (xb/y)

between the legtn xb of the second bonding part 21b and the length y of the non-bonding part 22 are in a range of 0.8 to 1.2.

It was experimentally confirmed that when in one bonding region, bonding parts were set to be longer than a non-bonding part to exceed an appropriate ratio without setting lengths of the bonding parts and the non-bonding part to corresponding values to achieve the appropriate ratio within the above range, a stable bonding state of optical fibers was maintained during the rolling of an optical fiber ribbon but flexibility required to roll the optical fiber ribbon 100 decreased and a section in which excessive bending stress was applied to the optical fibers at a location of a bonding part 21 separated during the separation of the optical fibers from the optical fiber ribbon increased. Therefore, some portions of the optical fibers may be damaged. In contrast, when the lengths of the bonding parts were set to be less than that of the non-bonding part to be below the appropriate ratio, a separation force was not large during the separation of the optical fibers from the optical fiber ribbon and thus workability was high but there may be a region in which bonding parts are separated when the optical fiber ribbon was rolled in a width direction.

Therefore, the lengths xa and xb of the bonding parts 21a and 21b and the length y of the non-bonding part 22 of the bonding region 20 are preferably set to be in an appropriate range of lengths within the above range, thereby minimizing the separation of the optical fibers 10 during the rolling of the optical fiber ribbon 100 and damage to the optical fibers 10 due to an increase of the vertical separation force T even during the separation of the optical fibers 10 from the optical fiber ribbon 100.

When the optical fiber ribbon 100 includes N optical fibers 10, a position of a bonding region 20, which is configured to bond an $n^{th}$ optical fiber 10 (n is a natural number greater than or equal to 1) and an $(n+1)^{th}$ optical fiber 10 among the N optical fiber 10, in the longitudinal direction of the optical fibers 10 may be set to correspond to a midpoint between positions of two consecutive bonding regions 20 configured to bond the $(n+1)^{th}$ optical fiber 10 and an $(n+2)^{th}$ optical fiber 10 (n+2 is a natural number equal to or less than N) in the longitudinal direction of the optical fibers 10 to set a length G of the non-bonding section of the optical fiber ribbon 100 to a predetermined distance. Therefore, uniform flexibility of the optical fiber ribbon 100 may be secured in the longitudinal direction.

In the embodiments of FIGS. 1 to 5, the optical fiber ribbon 100 includes twelve optical fibers 10 (ok?), and for example, bonding regions 20, which are spaced apart from each other and configured to bond a fourth ($n^{th}$) (n=4) optical fiber 10 (4) and a fifth ($(n+1)^{th}$) optical fiber 10 (5), may be set to be positioned between bonding regions 20, which are spaced apart from each other and configured to bond the fifth ($(n+1)^{th}$) optical fiber 10 (5) and a sixth $(n+2)^{th}$ optical fiber 10 (6), so that the non-bonding section having the length G may be provided in the optical fiber ribbon 100 at regular intervals in the longitudinal direction of the optical fiber ribbon 100.

Therefore, the optical fiber ribbon 100 according to the present disclosure can be rolled in the width direction and a separation force can be appropriately controlled on each bonding region 20 during the separation of each pair of adjacent optical fibers 10, because the bonding of each pair of adjacent optical fibers 10 may be maintained through each bonding region 20 by an appropriate bonding force.

Figure 6:
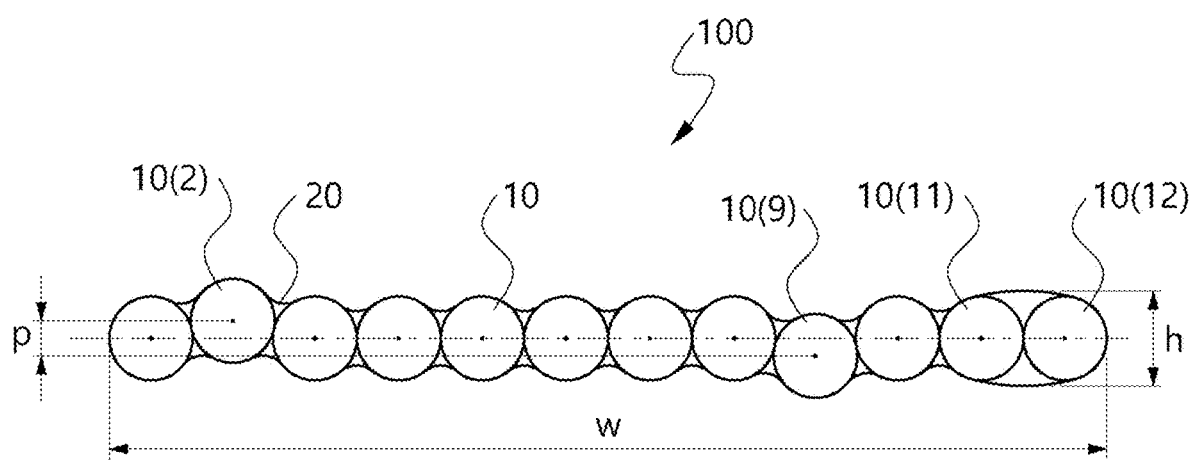
FIG. 6 is a cross-sectional view of an optical fiber ribbon according to an embodiment of the present disclosure.

FIG. 6 is a cross-sectional view of an optical fiber ribbon according to an embodiment of the present disclosure.

As shown in FIG. 6, an optical fiber 10 of an optical fiber ribbon 100 may be a fine-diameter optical fiber 10 with a diameter greater than or equal to 180 µm and less than 230 µm or a general optical fiber 10 with a diameter of 230 µm to 270 µm. When the optical fiber ribbon 100 is formed by bonding twelve optical fibers 10, a width w of the optical fiber ribbon 100 may be set to be equal to or less than 3.22 mm that is a limit value according to the IEC standards or the ANSI/ICEA standards related to optical fiber ribbons.

It is ideal that a plurality of optical fibers 10 are bonded to each other such that the centers thereof are located on the same axis with respect to a cross section of the optical fiber ribbon 100 as shown in FIG. 6, but an error may occur during the bonding of the plurality of optical fibers 10. Even when such an error occurs, a deviation in height between adjacent optical fibers of the optical fiber ribbon 100 is preferably minimized to provide optimal rolling performance.

In the embodiment of FIG. 6, among the twelve optical fibers 10 of the optical fiber ribbon 100, a second optical fiber 10 (2) and a ninth optical fiber 10 (9) are bonded at heights higher than or lower than a reference height but a difference p in height between the centers of the second optical fiber 10 (2) and the ninth optical fiber 10 (9) should be 75 µm or less to be smaller than a radius of each optical fiber 10 according to the IEC standards or the ANSI/ICEA standards related to optical fiber cables.

In addition, one or more bonding parts 21 of each bonding region 20 may be cured in an inwardly curved shape when an appropriate amount of a resin is used but may be cured in an outwardly curved shape similar to a bonding region 20 for bonding an eleventh optical fiber 10 (11) and a twelfth optical fiber 10 (12) when the amount of resin is not adjusted and an excessive amount of the resin is injected.

Meanwhile, even when one or more bonding parts 21 of the bonding region 20 protrude from the outside of the optical fiber 10, a maximum thickness h of one or more bonding parts 21 of each bonding region 20 is preferably set to be equal to or less than 360 µm that is a limit value according to the IEC standards or the ANSI/ICEA standards related to optical fiber cables.

In addition, one or more bonding parts 21 of each bonding region 20 may be formed by curing various types of resins, such as a UV curable resin or laser sintering resin powder, by UV light or laser sintering, and the amounts of the resin used to form one or more bonding region 21 of each bonding region 20 may be set to' be substantially the same.

In one or more bonding parts 21 of each bonding region 20, an elongation of the cured or sintered resin may be in a range of 40% to 210%, and preferably, a range of 85% to 190%, and a density thereof may be in a range of 0.8 g/cm$^3$ to 1.4 g/cm$^3$, and preferably, a range of 1.0 g/cm$^3$ to 1.2 g/cm$^3$ to allow the optical fiber ribbon 100 to be rolled and guarantee the complete separation of each bonding region 20 during the separation of bonded optical fibers.

In order to maintain the rolling of the optical fiber ribbon 100 in the width direction or a rolled state thereof, a secant modulus of elasticity of one or more bonding parts 21 of each bonding region 20 may be in a range of 4 MPa to 90 MPa, and preferably, a range of 5 MPa to 74 MPa, at a strain rate of 2.5%.

In order to form a plurality of bonding regions 20 to be spaced apart from each other in the longitudinal direction of the optical fibers 10, it is necessary to accurately and quickly apply a resin or the like to form one or more bonding parts 21 of each bonding region 20 in a desired pattern while securing flowability to prevent the resin from flowing downward before the resin is cured or sintered. Thus, the one or more bonding parts 21 of each bonding region 20 may have a viscosity of 80 mPa·s to 800 mPa·s, and preferably, 90 mPa·s to 520 mPa·s at 30° C.

Figure 7:
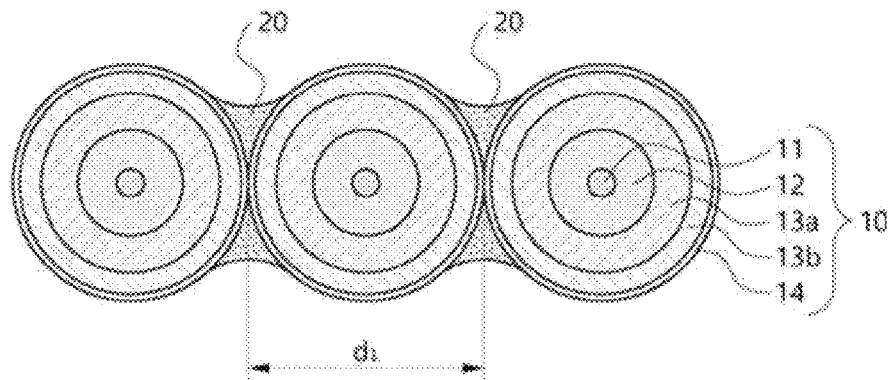
FIG. 7 is an enlarged cross-sectional view of an optical fiber ribbon according to an embodiment of the present disclosure.
Figure 8:
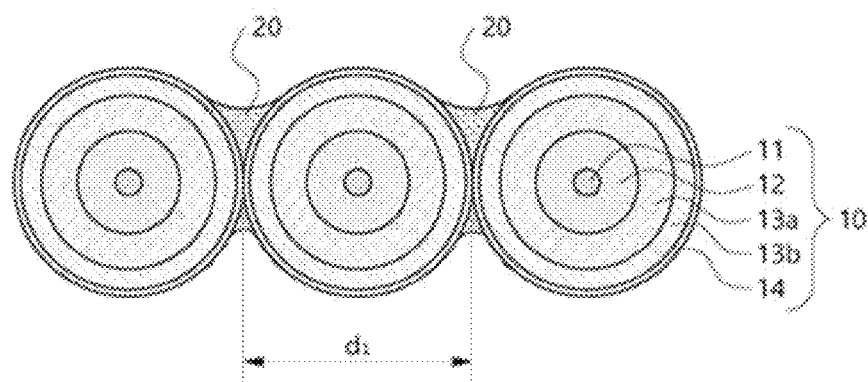
FIG. 8 is an enlarged cross-sectional view of an optical fiber ribbon according to another embodiment of the present disclosure.
Figure 9:
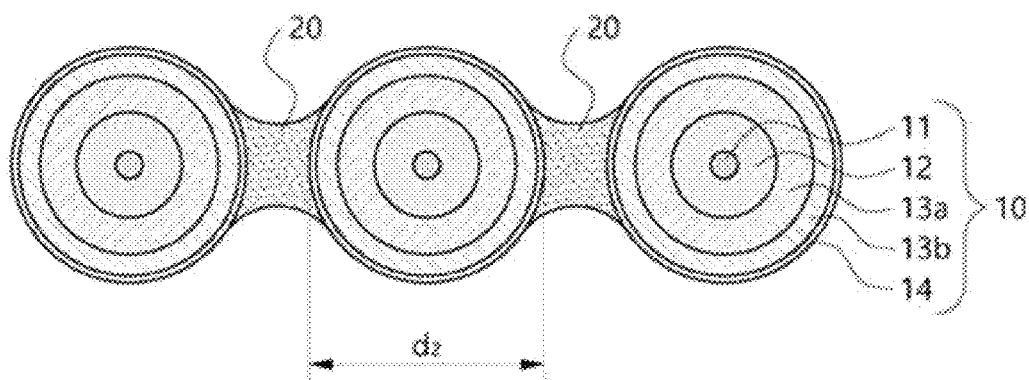
FIG. 9 is an enlarged cross-sectional view of an optical fiber ribbon according to another embodiment of the present disclosure.

FIG. 7 is an enlarged cross-sectional view of an optical fiber ribbon according to an embodiment of the present disclosure. FIG. 8 is an enlarged cross-sectional view of an optical fiber ribbon according to another embodiment of the present disclosure. FIG. 9 is an enlarged cross-sectional view of an optical fiber ribbon according to another embodiment of the present disclosure.

Specifically, in the embodiment of FIG. 7, optical fibers 10 of an optical fiber ribbon 100 are general optical fibers having a diameter d1 of 230 µm to 270 µm. In the embodiment of FIG. 8, optical fibers 10 of an optical fiber ribbon 100 are general optical fibers having a diameter d1 of 230 µm to 270 µm. In the embodiment of FIG. 9, optical fibers 10 of an optical fiber ribbon 100 are optical fibers having a fine diameter d2 of 180 µm or more and less than 230 µm.

A plurality of optical fibers 10 of an optical fiber ribbon 100 according to the present disclosure may each include a core 11, a cladding layer 12, a coating layer 13, and a coloring layer 16.

The core 11 may be formed of glass or a synthetic resin material and transmit light.

The cladding layer 12 may be formed to surround the core 11. The cladding layer 12 may include silica-based glass or a synthetic resin having a relatively lower refractive index than that of the core 11 to allow light passing through the center of the optical fiber 10 to be totally reflected to transmit a signal.

The coating layer 13 may be formed by coating a surface of the cladding layer 12 with a material including at least one among acrylate, polyimide, and carbon.

The coating layer 13 includes one or more layers, and preferably, a first coating layer 13a and a second coating layer 13b. The first coating layer 13a directly surrounds the cladding layer 12 and thus may include a material having a relatively low modulus to absorb external shock transferred to the cladding layer 12, and the second coating layer 13b may include a material having a relatively high modulus to mitigate external shock. The coating layer 13 may include an additional coating layer to protect the core 11 and the cladding layer 12, in addition to the first coating layer 13a and the second coating layer 13b.

The coloring layer 14 is formed from coating material containing a colored or colorless pigment applied on a surface of the coating layer 13 to give a color to the optical fiber 10 to be distinguished by the color from other optical fibers.

The coloring layer 14 may include a material that is a mixture of a coloring agent and a resin to give a color to the optical fiber 10. Preferably, a color coating method of applying coloring pigment particles and a resin containing oxygen of a certain concentration onto the surface of the optical fiber 10 and curing the resultant optical fiber 10 may be used.

Generally, an outer diameter of the optical fiber 10, excluding the coating layer 13 and the coloring layer 14, of the optical fiber ribbon 100 according to an embodiment of the present disclosure may be 125±1 µm. Thicknesses of the coating layer 13 and the coloring layer 14 may be determined according to a purpose.

Therefore, a total outer diameter of the optical fiber 10 of the optical fiber ribbon 100 according to an embodiment of the present disclosure may be the sum of the outer diameter of the cladding layer 12 and the thicknesses of the coating layer 13 and the coloring layer 14, and may be in a range of 250±1 µm.

In each of the optical fiber ribbons 100 shown in FIGS. 7 and 8, twelve general optical fibers 10 are bonded such that most adjacent optical fibers 10 are circumscribed about each other to satisfy 3.22 mm (3,220 µm) that is a limit value of a width w of a 12-core optical fiber ribbon according to the IEC standards or the ANSI/ICEA standards related to optical fiber ribbons or optical fiber cables.

That is, because the sum of diameters d1 of 250 µm of the twelve optical fibers 10 is 3,000 µm, bonding regions 20 may be formed while most optical fibers 10 are circumscribed about each other and the optical fibers 10 may be bonded to each other through bonding parts 21 of the bonding regions 20 even when some of the optical fibers 10 are bonded while being spaced apart from each other (see FIG. 9).

The embodiment shown in FIG. 8 is a case in which in the bonding regions 20 of the optical fiber ribbon 100, the amount of the resin applied on one side, e.g., a lower portion, of the optical fiber ribbon 100 is less than the amount of the resin applied on another side, e.g., an upper portion, of the optical fiber ribbon 100.

As shown in FIG. 8, excellent rolling characteristics may be achieved in one direction when the optical fiber ribbon 100 is rolled and a total amount of the resin may be reduced, even when the amount of the resin applied on a bonding region 20 at one side of the optical fiber ribbon 100 is 50% or less of the amount of the resin applied on a bonding region 20 at another side of the optical fiber ribbon 100 instead of applying the same amount of the resin on the bonding regions 20 on opposite sides of the optical fiber ribbon 100.

On the other hand, the optical fiber ribbon 100 shown in FIG. 9 is formed by bonding twelve fine-diameter optical fibers 10, and the sum of diameters d2 of the optical fibers 10 is only up to 2,640 µm and thus is less than 3.22 mm (3,220 µm) that is a limit of a width of a 12-core optical fiber ribbon 100.

When the optical fiber ribbon 100 is formed by discontinuously bonding the optical fibers 10, bonding performance may be improved when bonding regions 20 are formed by bonding the optical fibers 10 with a resin while the optical fibers 10 are spaced apart from each other as shown in FIG. 9 than when the optical fibers 10 are bonded while being circumscribed about each other.

That is, when twelve fine-diameter optical fiber optical fibers 10 are bonded to form the optical fiber ribbon 100, the bonding regions 20 may be formed while most optical fibers 10 are spaced apart from each other, and the optical fibers 10 may be bonded to each other through bonding parts 21 of the bonding regions 20.

Figure 10:
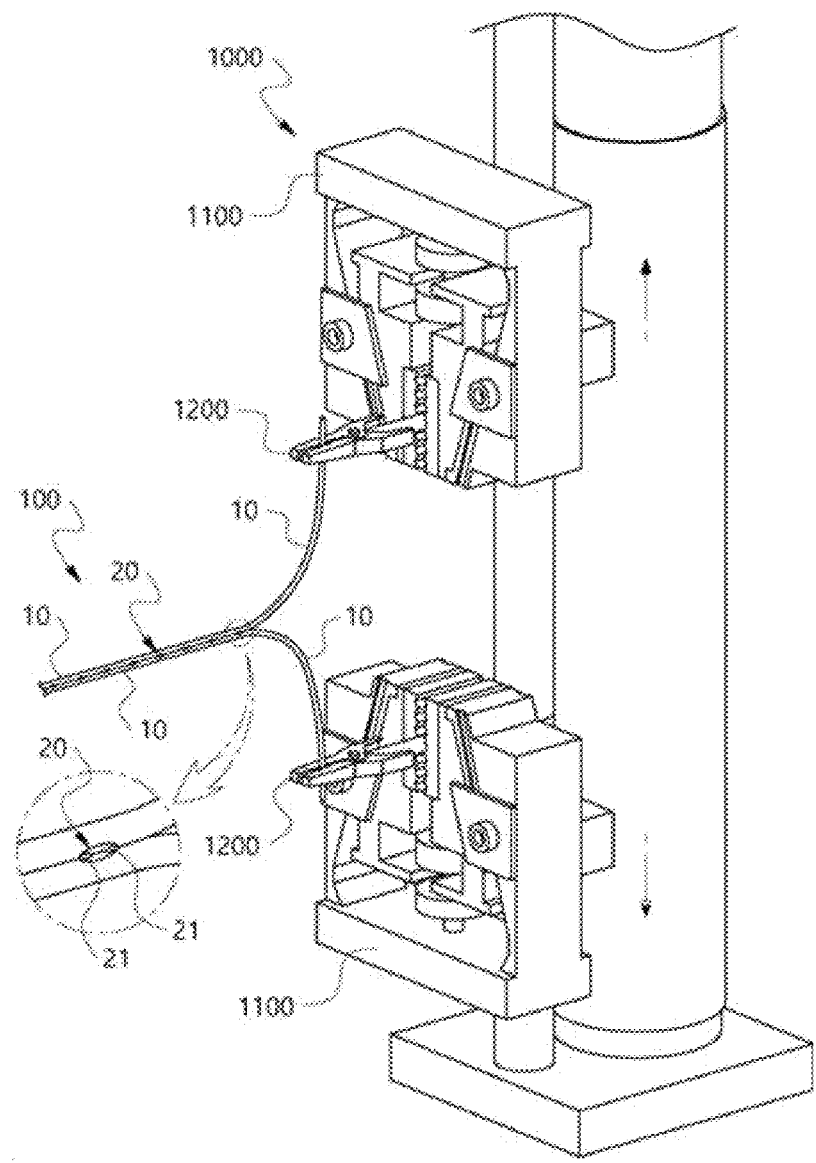
FIG. 10 illustrates a separation force measuring device for measuring a vertical separation force in a bonding region of an optical fiber ribbon according to the present disclosure.

FIG. 10 illustrates a separation force measuring device for measuring a vertical separation force in a bonding region of an optical fiber ribbon in a longitudinal direction of optical fibers according to the present disclosure.

FIG. 10 illustrates an example in which a separation force is measured in each of a plurality of bonding regions 20 of an optical fiber ribbon 100 in a direction perpendicular to a longitudinal direction of optical fibers according to the present disclosure. To measure a vertical separation force, after ends of a pair of optical fibers 10 bonded through the plurality of bonding regions 20, which are spaced apart from each other, of the optical fiber ribbon 100 were split, the split ends of the pair of optical fibers spaced 10 cm from the bonding regions 20 were fixed on a pair of grippers 1200 of a pair of mounts 1100 that can be transferred in a direction opposite to the separation force measuring device 1000. Thereafter, the pair of optical fibers 10 fixed on the pair of grippers 1200 were drawn at a speed of 500 mm/min in opposite directions, and a separation force was measured on each bonding region 20 during the separation of the pair of optical fibers 10.

Specifically, a separation force required to separate one bonding region 20 when the pair of bonded optical fibers 10 of the optical fiber ribbon 100 were split and separated in a vertical direction, i.e., the vertical separation force T on one bonding region 20, was measured using a sensor, such as a load cell, by the separation force measuring device 1000.

Figure 11:
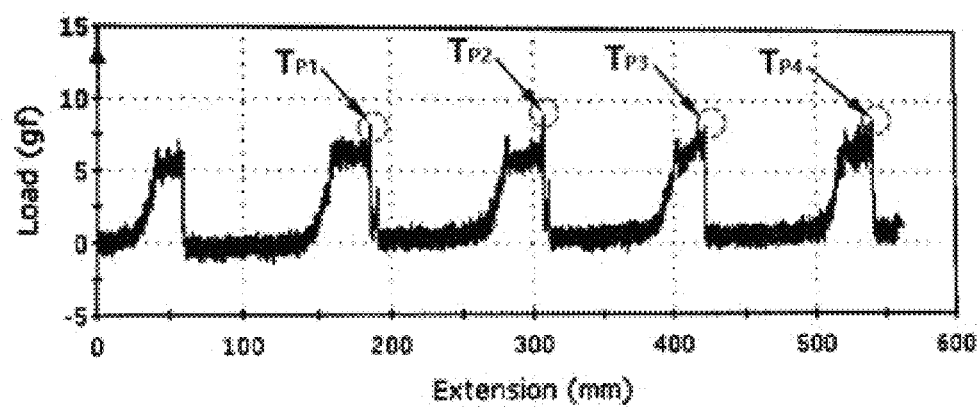
FIG. 11 is a graph showing a peak value in each bonding region when a vertical separation force of an optical fiber ribbon was measured by the separation force measuring device of FIG. 10.

FIG. 11 is a graph showing peak values $T_{p1}$, $T_{p2}$, $T_{p3}$, and $T_{p4}$ of vertical separation forces T of an optical fiber ribbon 100 measured on four consecutive bonding regions 20 of the pair of optical fibers 10 bonded to each other in the longitudinal direction by the separation force measuring device 1000 of FIG. 10.

An average vertical separation force $T_{avg}$ of the optical fiber ribbon 100 may be calculated by Equation 1 below.

$$T_{avg} = (T_{p1} + T_{p2} + T_{p3} + T_{p4}/4) \text{ (unit: } gf) \qquad \text{[Equation 1]}$$

Here, $T_{p1}$, $T_{p2}$, $T_{p3}$, and $T_{p4}$ denote peak values of vertical separation forces measured on four random consecutive bonding regions 20 the pair of optical fibers 10 bonded to each other in the longitudinal direction, and the average vertical separation force $T_{avg}$ denotes an average of peak values of the vertical separation forces measured on the four consecutive bonding regions 20.

As shown in FIG. 11, in the optical fiber ribbon 100 of the present disclosure, the average vertical separation force $T_{avg}$ measured on each bonding region 20 is set to 10 gf or less to facilitate the separation of the optical fibers 10. In the optical fiber ribbon 100 of the present disclosure, a minimum value among the peak values $T_{p1}$, $T_{p2}$, $T_{p3}$, and $T_{p4}$ of the vertical separation forces measured on the four consecutive bonding regions 20 spaced apart from each other in the longitudinal direction of the optical fibers 10 may be 50% or more of a maximum value and may be 70% or more of an average of these peak values, i.e., the average vertical separation force $T_{avg}$, and thus, uniform vertical separation characteristics may be exhibited during the splitting of the optical fiber ribbon 100.

Figure 12:
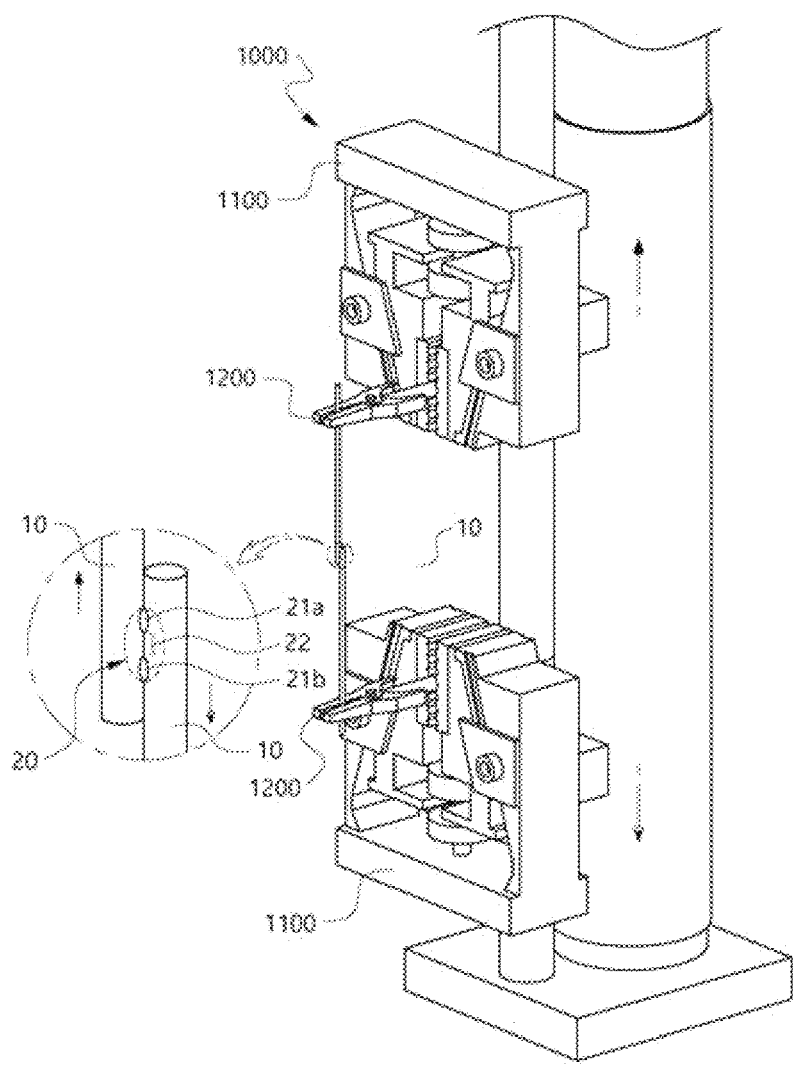
FIG. 12 illustrates a separation force measuring device for measuring a horizontal separation force in a bonding region of an optical fiber ribbon according to the present disclosure.

FIG. 12 illustrates a separation force measuring device for measuring a horizontal separation force on a bonding region of an optical fiber ribbon according to the present disclosure in a longitudinal direction of optical fibers.

FIG. 12 illustrates an example in which a horizontal separation force is measured in each of a plurality of bonding regions 20 of an optical fiber ribbon 100 according to the present disclosure in a direction parallel to a longitudinal direction of optical fibers. In order to measure a horizontal separation force, a pair of optical fibers 10 bonded to each other through one bonding region 20 among the plurality of optical fibers 10 of the optical fiber ribbon 100 were separated from the optical fiber ribbon 100, and optical fiber regions of unnecessary optical fibers having one bonding region 20 interposed therebetween the bonding region 20 were cut and removed as shown in the enlarged view of FIG. 12. Next, opposite ends of the pair of optical fibers 10 spaced 10 cm from the bonding region 20 were fixed on the pair of grippers 1200 of the separation force measuring device 1000, and a horizontal separation force B required until the bonding region 20 was broken and the pair of optical fibers 10 were separated from each other was measured during the pulling of the pair of optical fibers 10 fixed on the pair of grippers 1200 at a speed of about 500 mm/min in the longitudinal direction of the optical fibers 10.

Although it is illustrated that the separation force measuring device 1000 shown in FIG. 12 for measuring a horizontal separation force is the same as the separation force measuring device shown in FIG. 10, the present disclosure is not limited thereto, and various types of equipment for fixing ends of a pair of optical fiber 10 and pulling the pair of optical fibers 10 in parallel in the longitudinal direction of the optical fibers 10 may be used.

In the present disclosure, an average horizontal separation force $B_{avg}$ of the optical fiber ribbon 100 may be calculated by Equation 2 below.

$$B_{avg} = (B_{p1} + B_{p2} + B_{p3} + B_{p4}/4) \text{ (unit: } gf) \qquad \text{[Equation 2]}$$

Here, $B_{p1}$, $B_{p2}$, $B_{p3}$, and $B_{p4}$ denote peak values of horizontal separation forces measured on four samples including one bonding region 20 of the optical fiber ribbon 100, and the average horizontal separation force $B_{avg}$ denotes an average of peak vales of horizontal separation forces measured on four bonding regions 20 of the four samples. The four samples were collected from the same pair of optical fibers 10 of the optical fiber ribbon 100 within a length range of 2 m or less of the optical fibers 10 in the longitudinal direction.

When the average horizontal separation force $B_{avg}$ is calculated by the above method, an average horizontal separation force $B_{avg}$ on each bonding region of the optical fiber ribbon 100 of the present disclosure may be 300 gf or more.

A minimum value among the peak values $B_{p1}$, $B_{p2}$, $B_{p3}$, and $B_{p4}$ of the horizontal separation forces measured on the four bonding regions 20 of the pair of optical fibers 10 of the optical fiber ribbon 100 according to the present disclosure was 40% or more of a maximum value, and when the minimum value was set to an average of these peak values, i.e., 60% or more the average horizontal separation force $B_{avg}$, uniform horizontal separation characteristics were achieved during the splitting of the optical fiber ribbon 100.

EXAMPLES

1. Preparation of Optical Fiber Ribbon Samples

Samples of the optical fiber ribbon 100 satisfying the design conditions defined in Table 1 below, e.g., the length A of each bonding region 20, the length x of each bonding part 21, the number of bonding parts 21 in each bonding region 20, the sum of the lengths of the bonding parts 21, the length y of each non-bonding part 22, the number of non-bonding parts 22 in each bonding region 20, and the sum of the lengths of the non-bonding parts 22, were prepared

TABLE 1

| Sample | Bonding region A [mm] | Bonding part x [mm] | Number of bonding parts per bonding region | Total length of bonding parts [mm] | Non-bonding part y [mm] | Number of non-bonding parts per bonding region | Total length of non-bonding parts [mm] |
|---|---|---|---|---|---|---|---|
| 1 | 15 | 15 | 1 | 15 | 0 | 0 | 0 |
| 2 | 15 | 1 | 8 | 8 | 1 | 7 | 7 |
| 3 | 15 | 5 | 2 | 10 | 5 | 1 | 5 |
| 4 | 15 | 15 | 1 | 15 | 0 | 0 | 0 |
| 5 | 15 | 5 | 2 | 10 | 5 | 1 | 5 |
| 6 | 20 | 20 | 1 | 20 | 0 | 0 | 0 |
| 7 | 20 | 4 | 3 | 12 | 4 | 2 | 8 |
| 8 | 10 | 10 | 1 | 10 | 0 | 0 | 0 |
| 9 | 15 | 15 | 1 | 15 | 0 | 0 | 0 |
| 10 | 15 | 1 | 6 | 6 | 1.8 | 5 | 9 |
| 11 | 15 | 3 | 2 | 6 | 9 | 1 | 9 |

Figure 13:
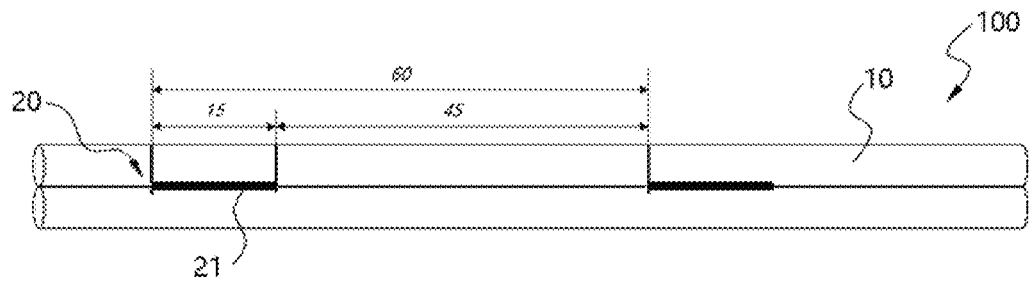
FIGS. 13 to 23 are plan views of samples 1 to 11 of an optical fiber ribbon.

FIGS. 13 to 23 are diagrams illustrating the structures of samples 1 to 11 prepared according to the design conditions defined in Table 1. As shown in FIG. 13, a sample 1 was prepared, in which each bonding region 20 configured to bond a pair of optical fibers 10 includes one integral bonding part 21 formed of a resin without non-bonding parts. In the sample 1, the length A of the bonding region 20, i.e., the length x of the bonding part 21, was 15 mm.

Figure 14:
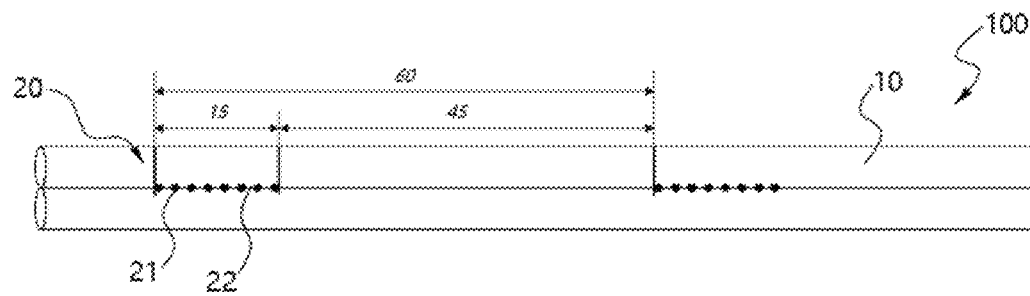

As shown in FIG. 14, a sample 2 was prepared, in which each bonding region 20 includes eight bonding parts 21 and seven non-bonding parts 22 between the eight bonding parts 21. In the sample 2, the length A of the bonding region 20 was 15 mm, and the length x of the bonding parts 21 and the length y of the non-bonding parts 22 were each 1 mm.

Figure 15:
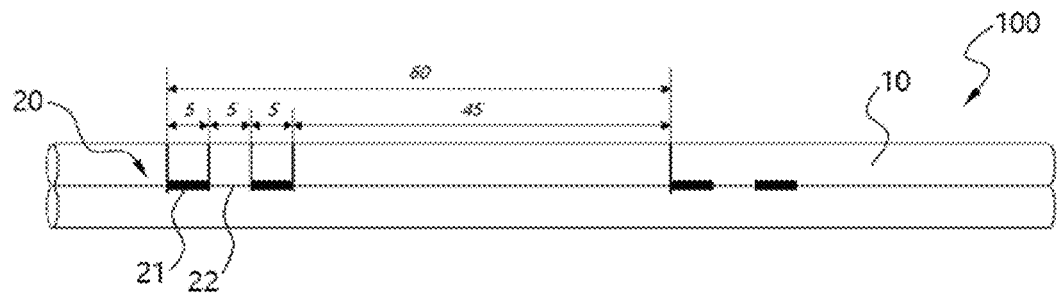

As shown in FIG. 15, a sample 3 was prepared, in which each bonding region 20 includes two bonding parts 21 and one non-bonding part 22 between the two bonding parts 21. In the sample 3, the length A of the bonding region 20 was 15 mm, and the length x of the bonding parts 21 and the length y of the non-bonding part 22 were each 5 mm.

Figure 16:
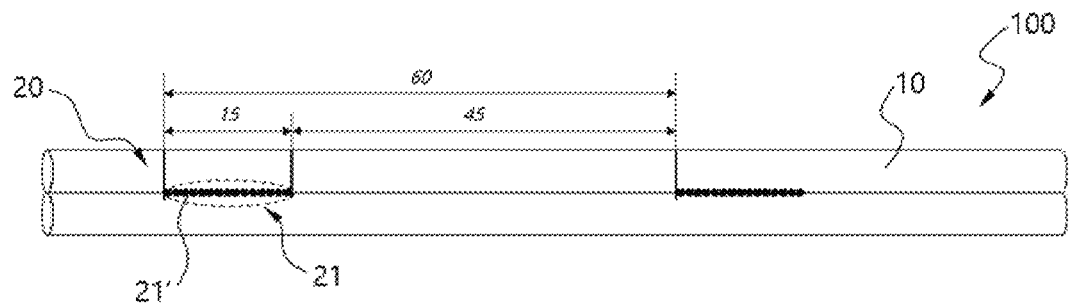

As shown in FIG. 16, a sample 4 was prepared, in which each bonding region 20 includes one bonding part 21 formed by connecting a plurality of bonding points 21' without non-bonding parts. In the sample 4, the length A of the bonding region 20, i.e., the length x of the bonding part 21, was 15 mm.

Figure 17:
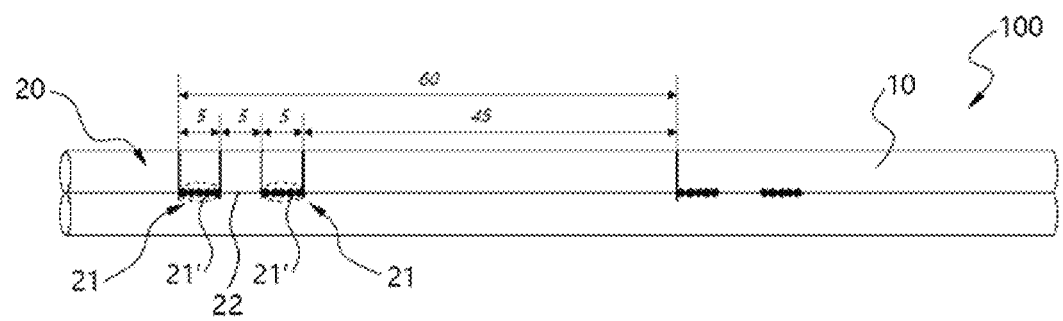

As shown in FIG. 17, a sample 5 was prepared, in which each bonding region 20 includes a pair of bonding parts 21 each formed by connecting a plurality of bonding points 21', and one non-bonding part 22 between the pair of bonding parts 21. In the sample 5, the length A of the bonding region 20 was 15 mm, and the length x of the bonding parts 21 and the length y of the non-bonding part 22 were each 5 mm.

Figure 18:
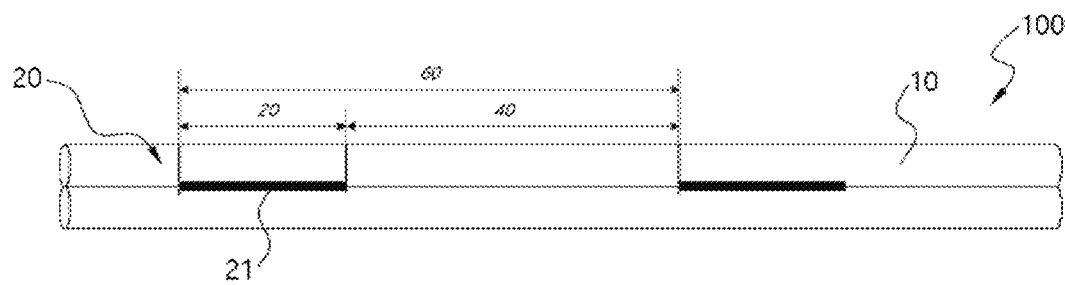

As shown in FIG. 18, a sample 6 was prepared, in which each bonding region 20 includes one integral bonding part 21 formed of a resin without non-bonding parts. In the sample 6, the length A of the bonding region 20, i.e., the length x of the bonding part 21, was 20 mm.

Figure 19:
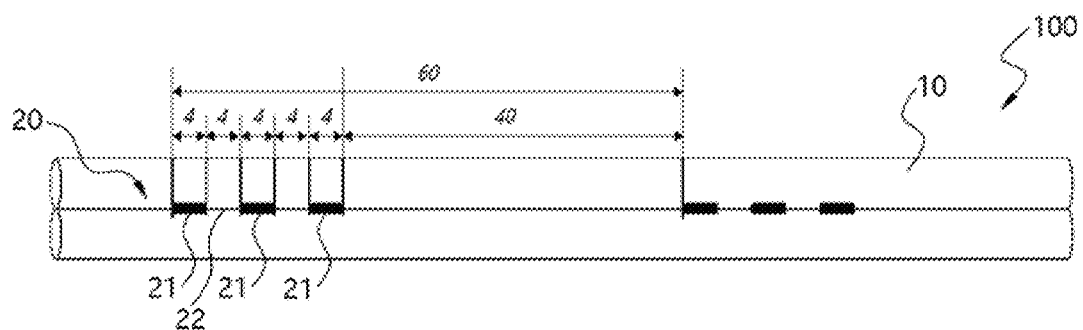

As shown in FIG. 19, a sample 7 was prepared, in which each bonding region 20 includes three bonding parts 21 and two non-bonding parts 22 between the three bonding parts 21. In the sample 7, the length A of the bonding region 20 was 20 mm, and the length x of the bonding parts 21 and the length y of the non-bonding parts 22 were each 4 mm.

Figure 20:
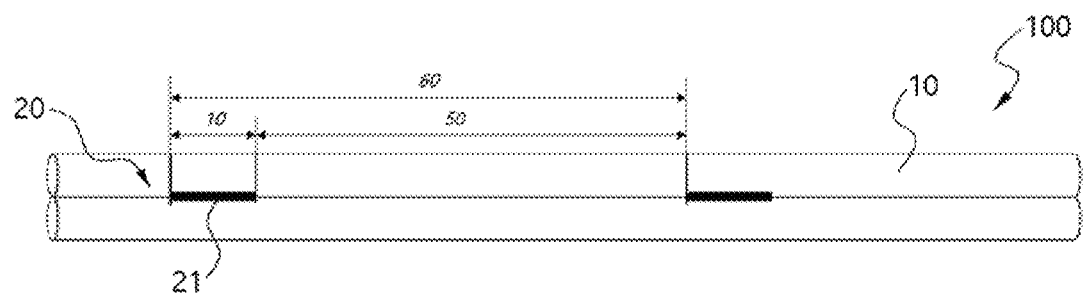

As shown in FIG. 20, a sample 8 was prepared, in which each bonding region 20 includes one integral bonding part 21 formed of a resin without non-bonding parts. In the sample 8, the length A of the bonding region 20, i.e., the length x of the bonding part 21, was 10 mm.

Figure 21:
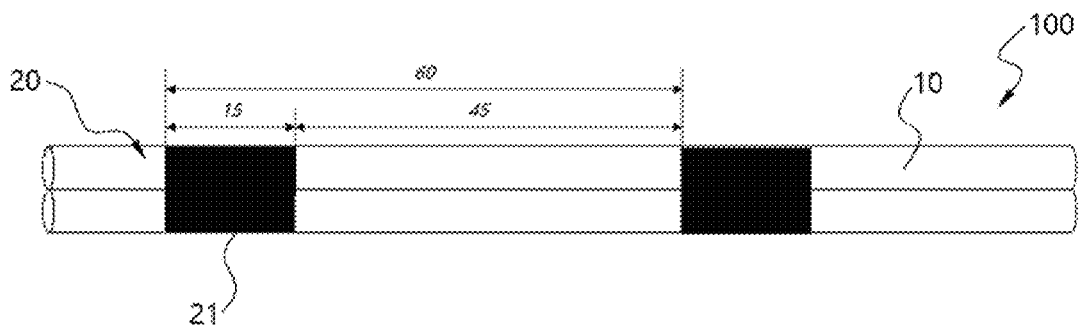

As shown in FIG. 21, a sample 9 was prepared, in which each bonding region 20 includes one integral bonding part 21 formed of a resin without non-bonding parts. In the sample 9, the length A of the bonding region 20, i.e., the length x of the bonding part 21, was 15 mm. Here, in the sample 9, the bonding region 20 was formed by forming the bonding part 21 by applying a relatively excessive amount of the resin in the width direction of the optical fibers 10.

Figure 22:
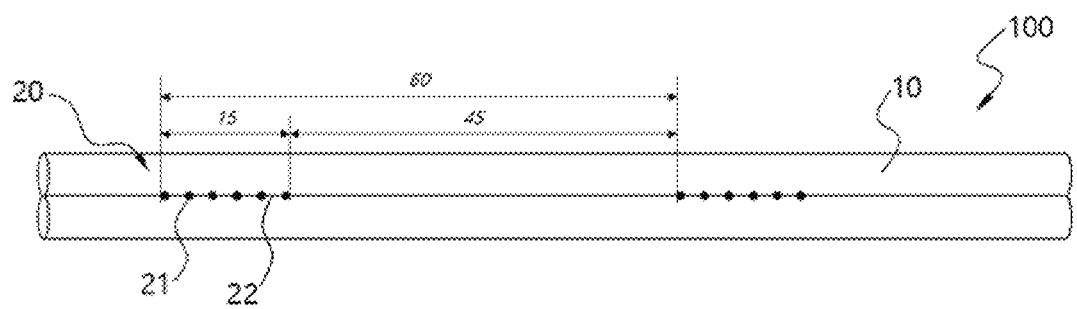

As shown in FIG. 22, a sample 10 was prepared, in which each bonding region 20 includes six bonding parts 21 and five non-bonding parts 22 between the six bonding parts 21. In the sample 10, the length A of the bonding region 20 was 15 mm, the length x of each bonding part 21 was 1 mm, the sum of the lengths of the bonding part 21 was 6 mm, the length y of each non-bonding part 22 was 1.8 mm and the sum of the lengths of the non-bonding parts 22 was 9 mm.

Figure 23:
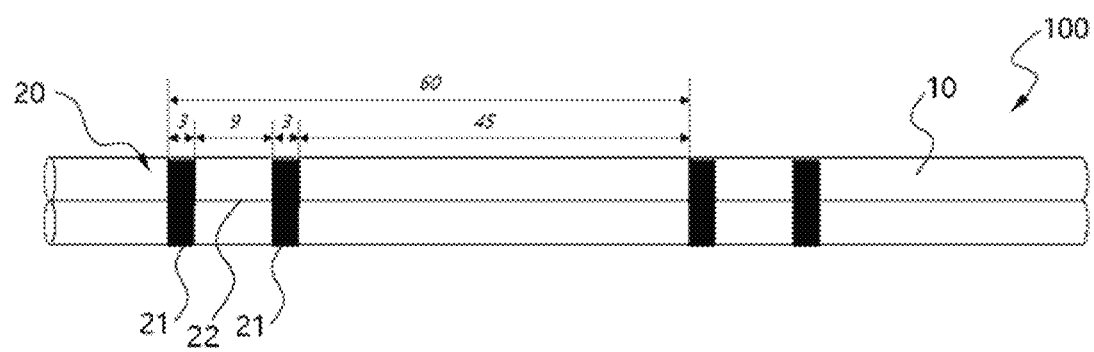

As shown in FIG. 23, a sample 11 was prepared, in which each bonding region 20 includes two bonding parts 21 and one non-bonding parts 22 between the two bonding parts 21. In the sample 11, the length A of the bonding region 20 was 15 mm, the length x of each bonding part 21 was 3 mm, the sum of the lengths of the bonding parts 21 was 6 mm, and the length y of the non-bonding part 22 was 9 mm.

2. Evaluation of Optical Fiber Ribbon Samples

A vertical separation force T and a horizontal separation force B of each of samples of an optical fiber ribbon prepared according to the design conditions listed in Table 1 above were measured, an average vertical separation force $T_{avg}$ and an average horizontal separation force $B_{avg}$ were calculated, the appearances of the samples were evaluated, and results were listed in Table 2 below. The vertical separation force T and the horizontal separation force B of each of the samples were calculated using the separation force measuring device 1000 and the separation force measuring method described above by measuring vertical separation forces on four consecutive bonding regions 20 of each of the samples, measuring horizontal separation forces on four samples collected from a pair of optical fiber ribbons within a length range of 2 m or less, and calculating an average of peak values of the four Vertical separation forces and an average of peak values of the four horizontal separation forces as the average vertical separation force $T_{avg}$ and the average horizontal separation force $B_{avg}$ respectively.

The appearance of each of the samples was evaluated as 'P' when the optical fibers 10 thereof were not separated or damaged and thus were determined as good, was evaluated as 'F1' when the bonding parts 21 are separated from the surface of the optical fibers 10 during the formation of the optical fiber ribbon 100 using each sample, and was evaluated as 'F2' when the coloring layer 14 was damaged during the splitting of the optical fibers 10 from each sample, and a result of the evaluation was listed in Table 2 below.

TABLE 2

| sample | 1 | 2 | 3 | 4 | 5 | 6 | 7 | 8 | 9 | 10 | 11 |
|---|---|---|---|---|---|---|---|---|---|---|---|
| average vertical separation force $T_{avg}$ [gf] | 4.20 | 5.48 | 9.49 | 4.00 | 7.60 | 4.15 | 7.63 | 3.33 | 10.90 | 5.26 | 7.96 |
| average horizontal separation force $B_{avg}$ [gf] | 393 | 301 | 380 | 346 | 321 | 620 | 467 | 334 | 441 | 182 | 261 |
| appearance evaluation | p | p | p | p | p | p | p | p | F2 | F1 | F1 |

Figure 24:
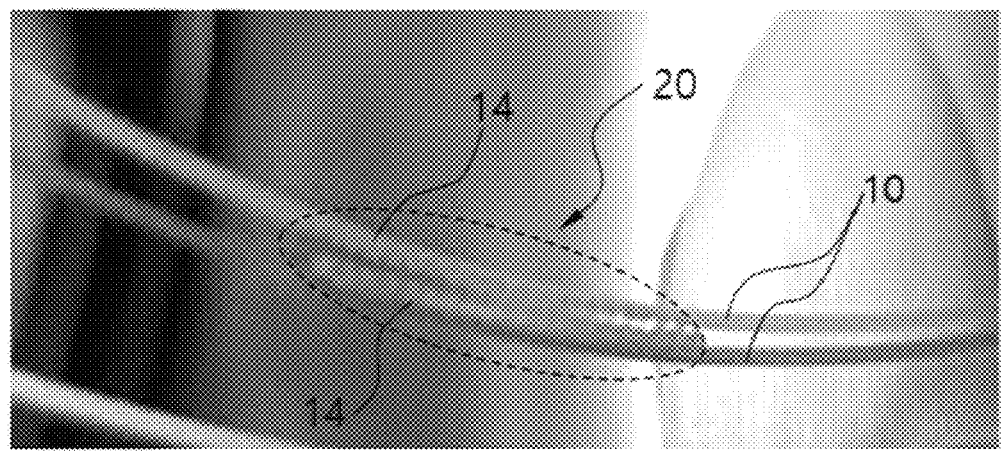
FIG. 24 illustrates a state of a sample 9 in which a coloring layer of an optical fiber was damaged.

As shown in Table 2 above, it was confirmed that in the case of the samples 1 to 8, the average vertical separation force $T_{avg}$ was 10 gf or less, the average horizontal separation force $B_{avg}$ was 300 gf, the appearance of the optical fiber ribbon 100 was good, and the bonding parts 21 were not separated from each bonding region 20 or were not damaged. In contrast, in the case of the sample 9, the bonding parts 21 were formed by applying an excessive amount of a resin and thus the average vertical separation force $T_{avg}$ was greater than 10 gf. Therefore, the optical fibers 10 were not smoothly split from the bonding region 20, thereby causing damage to the coloring layer 14 of the optical fibers 10 during the splitting of the optical fibers 10. FIG. 24 illustrates a state of the sample 9 in which the coloring layer 14 was damaged during the splitting of the optical fibers 10.

Figure 25:
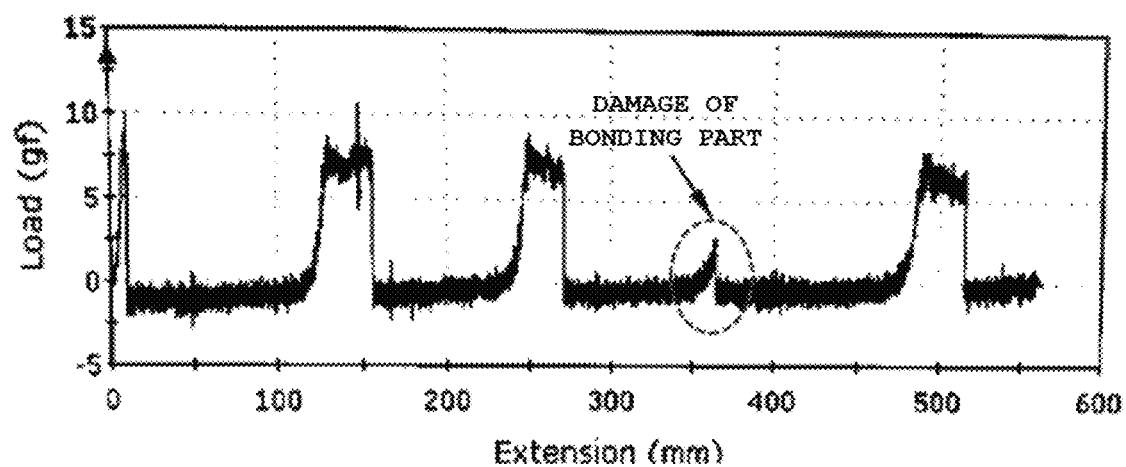
FIGS. 25 and 26 are graphs showing vertical separation forces of samples 10 and 11, in which positions on which bonding parts were damaged or separated are shown.
Figure 26:
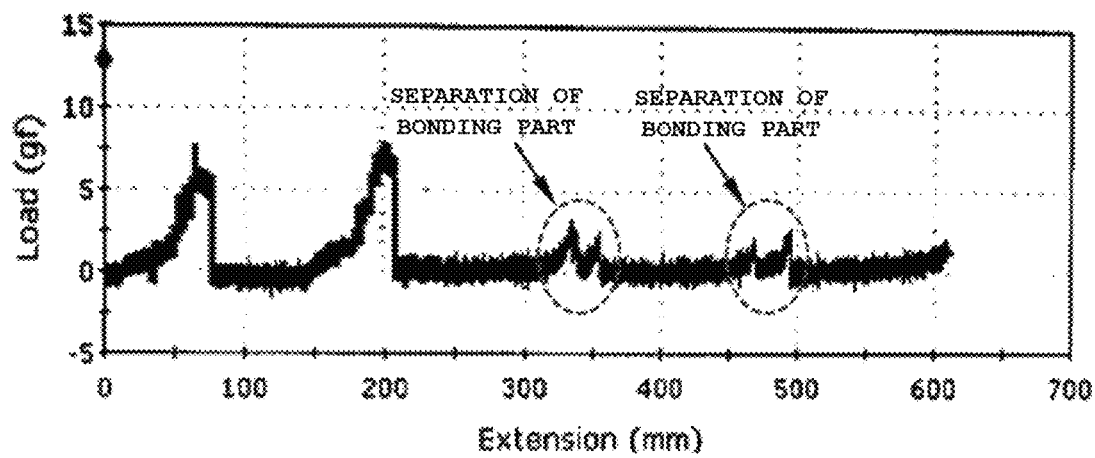

In the samples 10 and 11, the amount of the resin in each bonding region 20 was insufficient and thus the average horizontal separation force $B_{avg}$ was less than 300 gf. Accordingly, the bonding parts 21 of each bonding region 20 was damaged or separated during the manufacture of the optical fiber ribbon 100. FIGS. 25 and 26 are graphs showing vertical separation forces of the samples 10 and 11, in which positions on which bonding parts 21 were damaged are shown.

Accordingly, it was confirmed that when in various embodiments of each bonding region 20 of the optical fiber ribbon 100 of the present disclosure, a total length of bonding parts 21 of each bonding region 20 was about 0.8 to 1.2 times a total length of non-bonding parts 22, an average horizontal separation force $B_{avg}$ was 300 gf or more, thus facilitating the splitting of the optical fiber ribbon 100.

Furthermore, the present disclosure may further provide a manufacturing method of an optical fiber cable including the optical fiber ribbon 100 described above.

Figure 27:
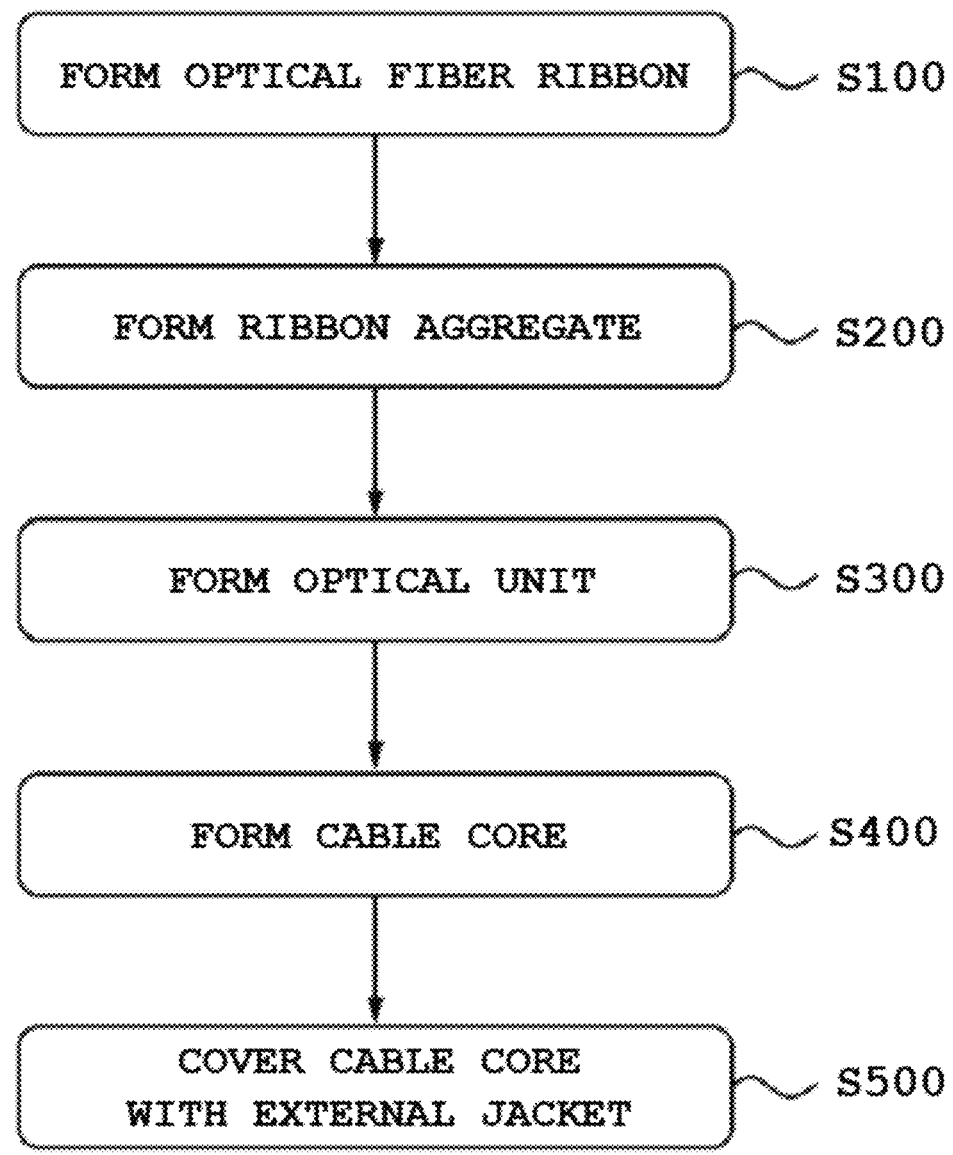
FIG. 27 is a flowchart of a manufacturing method of an optical fiber cable including an optical fiber ribbon according to the present disclosure.

FIG. 27 is a flowchart of a manufacturing method of an optical fiber cable including an optical fiber ribbon according to the present disclosure.

As shown in FIG. 27, a manufacturing method of an optical fiber cable with optical fiber ribbons 100 according to the present disclosure may include forming the optical fiber ribbons 100 by arranging a plurality of optical fibers 10 in parallel, intermittently applying a resin between each pair of adjacent optical fibers 10 in a longitudinal direction, and curing the resin by UV light to form bonding regions 20 (S100), forming an optical fiber ribbon aggregate by bonding the plurality of optical fiber ribbons 100 (S200), forming optical units by extruding a polymer insulating layer outside the optical fiber ribbon aggregate (S300), forming a cable core by aggregating cable components including the optical units (S400), and covering the cable core with an external jacket (S500).

Here, in the forming of the optical fiber ribbon (S200) or the forming of the cable core (S400), when in the bonding region 20 of each of the optical fiber ribbons 100, an average horizontal separation force $B_{avg}$ for separating the pair of optical fibers 10 from each other in a direction parallel to the longitudinal direction of the optical fibers 10 is set to 300 gf or more and an average vertical separation force $T_{avg}$ is set to 10 gf or less, the separation or damage of the optical fibers 10 can be sufficiently prevented during the manufacture of the optical fiber cable and the separation of the optical fibers 10 can be facilitated during the splitting of the optical fiber ribbon 100, thereby improving workability.

As described above, various embodiments of the optical fiber ribbon 100 according to the present disclosure can be derived by adjusting variables such as the length and period of the bonding region 20, the lengths of the plurality of bonding parts 21a and 21b and at least one non-bonding part 22 of the bonding region 20, and the physical properties of the resin used to form the bonding region 20. It was confirmed that as a result of measuring a vertical separation force T and a horizontal separation force B on the bonding region 20 in the longitudinal direction of the optical fibers 10 in each of various embodiments of the optical fiber ribbon 100, the separation workability of the optical fiber ribbon 100 was improved and a possibility that the optical fibers will be separated during the manufacture of an optical fiber cable decreased, when an average vertical separation force $T_{avg}$ was 10 gf or less, an average horizontal separation force $B_{avg}$ was 300 gf or more, and a ratio $B_{avg}/T_{avg}$ Of the average horizontal separation force $B_{avg}$ to the average vertical separation force $T_{avg}$ on the bonding region 20 satisfied a range of 30 to 1200.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. An optical fiber ribbon formed by bonding a plurality of optical fibers in parallel,
wherein a pair of adjacent optical fibers among the plurality of optical fibers are bonded to each other through a plurality of bonding regions spaced apart from each other in a longitudinal direction of the optical fibers,
wherein an average horizontal separation force for separating the pair of optical fibers from each other in a direction parallel to the longitudinal direction of the optical fibers is 300 gf or more in each of the bonding regions, and
wherein an average vertical separation force for separating the pair of optical fibers from each other in a direction perpendicular to the longitudinal direction of the optical fibers is 8 gf or less in each of the bonding regions.

2. The optical fiber ribbon of claim 1, wherein a ratio of the average vertical separation force to the average horizontal separation force is in a range of 30 to 1200 in each of the bonding regions.

3. The optical fiber ribbon of claim 1, wherein the average vertical separation force is an average of peak values of separation forces measured on four consecutive bonding regions among the plurality of bonding regions,
wherein a minimum value among the peak values of the separation forces is 50% or more of a maximum value among the peak values of the separation forces and 70% or more of the average vertical separation force.

4. The optical fiber ribbon of claim 1, wherein the average horizontal separation force is an average of peak values of separation forces measured on four consecutive bonding regions among the plurality of bonding regions,
wherein a minimum value among the peak values of the separation forces is 40% or more of a maximum value among the peak values of the separation forces and 60% or more of the average horizontal separation force.

5. The optical fiber ribbon of claim 1, wherein the average horizontal separation force is preferably 600 gf or more in each of the bonding regions.

6. The optical fiber ribbon of claim 1, wherein a plurality of non-bonding sections on which all of the optical fibers are not bonded are provided on a cross section of the optical fiber ribbon in the longitudinal direction to be spaced apart from each other.

7. The optical fiber ribbon of claim 1, wherein the plurality of bonding regions each comprise a plurality of bonding parts spaced apart from each other and at least one non-bonding part between the plurality of bonding parts.

8. The optical fiber ribbon of claim 7, wherein each of the plurality of bonding parts comprises a plurality of bonding points that are spaced apart from each other at predetermined intervals or that are connected to each other.

9. The optical fiber ribbon of claim 7, wherein a ratio between a length of the bonding parts and a length of the non-bonding part is in a range of 0.8 to 1.2.

10. The optical fiber ribbon of claim 1, wherein each of the plurality of bonding regions has a density of 0.8 g/cm$^3$ to 1.4 g/cm$^3$, an elongation of 40% to 210%, a secant modulus of elasticity of 4 MPa to 90 MPa at a strain rate of 2.5%, and viscosity of 80 mPa·s to 800 mPa·s at 25° C.

11. The optical fiber ribbon of claim 1, wherein the optical fiber ribbon comprises N optical fibers, wherein a position of a bonding region for bonding an $n^{th}$ optical fiber and an $(n+1)^{th}$ optical fiber among the N optical fibers in the longitudinal direction of the optical fibers corresponds to a center of a bonding region for bonding the $(n+1)^{th}$ optical fiber and an $(n+2)^{th}$ optical fiber in the longitudinal direction, wherein n is a natural number greater than or equal to 1 and (n+2) is a natural number equal to or less than N.

12. A manufacturing method of an optical fiber cable comprising:
forming each of a plurality of optical fiber ribbons by arranging a plurality of optical fibers in parallel, intermittently applying a resin between a pair of optical fibers in a longitudinal direction, and curing the resin by ultraviolet (UV) light to form a plurality of bonding regions;
forming a ribbon aggregate by aggregating the optical fiber ribbons;
forming optical units by extruding a polymer insulating layer outside the ribbon aggregate;
forming a cable core by aggregating the optical units; and
covering the cable core with an external jacket,
wherein, in the forming of the ribbon aggregate or the forming of the cable core, an average horizontal separation force for separating the pair of optical fibers from each other on each of the bonding regions of the optical fiber ribbons in a direction parallel to a longitudinal direction of the optical fibers is 300 gf or more, and
wherein, in the forming of the ribbon aggregate or the forming of the cable core, an average vertical separation force for separating the pair of optical fibers from each other on each of the bonding regions of the optical fiber ribbons in a direction perpendicular to the longitudinal direction of the optical fibers is 8 gf or less.

13. The manufacturing method of claim 12, wherein the forming of the ribbon aggregate comprises aggregating the plurality of optical fiber ribbons and a waterproof member.

14. The manufacturing method of claim 12, wherein, in the forming of the optical units, the polymer insulating layer is in the form of a tube.

15. The manufacturing method of claim 12, wherein the forming of the cable core comprises aggregating the plurality of optical units and a waterproof member.

* * * * *